(12) United States Patent
Lin et al.

(10) Patent No.: US 10,722,847 B2
(45) Date of Patent: Jul. 28, 2020

(54) COMPOSITE MEMBRANES AND METHODS OF MAKING AND USE THEREOF

(71) Applicant: Vanderbilt University, Nashville, TN (US)

(72) Inventors: Shihong Lin, Nashville, TN (US); Zhangxin Wang, Nashville, TN (US); Yu-Xi Huang, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 116 days.

(21) Appl. No.: 15/995,677

(22) Filed: Jun. 1, 2018

(65) Prior Publication Data

US 2018/0345227 A1 Dec. 6, 2018

Related U.S. Application Data

(60) Provisional application No. 62/513,757, filed on Jun. 1, 2017.

(51) Int. Cl.
*B01D 69/12* (2006.01)
*B01D 69/14* (2006.01)
(Continued)

(52) U.S. Cl.
CPC ......... *B01D 69/12* (2013.01); *B01D 67/0002* (2013.01); *B01D 67/0088* (2013.01);
(Continued)

(58) Field of Classification Search
None
See application file for complete search history.

(56) References Cited

U.S. PATENT DOCUMENTS 6,521,012 B2    2/2003 Lamon et al.
9,834,459 B2 *  12/2017 Tuteja ............... B01D 17/06
9,868,911 B2 *  1/2018  Reams ............... C10G 31/09

FOREIGN PATENT DOCUMENTS

WO    WO-2011117443 A1 *  9/2011  .......... B01D 61/364

OTHER PUBLICATIONS

Zhang et al, Journal of Membrane Science 349 (2010) 295-303.*
(Continued)

*Primary Examiner* — Krishnan S Menon
(74) *Attorney, Agent, or Firm* — Meunier Carlin & Curfman LLC

(57) ABSTRACT

Disclosed herein are composite membranes comprising an omniphobic substrate having a reentrant structure. The omniphobic substrate comprises a plurality of pores, the plurality of pores forming the reentrant structure. The omniphobic substrate further comprises a surface, the surface being coated with a dual functional layer that is hydrophilic in air and oleophobic under water, such that the composite membrane has a top portion and a bottom portion, the top portion comprising the coated surface of the omniphobic substrate, such that the top portion of the composite membrane is hydrophilic in air and oleophobic under water and the bottom portion of the composite membrane is omniphobic. The composite membrane can be antiwetting and/or antifouling in the presence of a hydrophobic contaminant, an amphiphilic contaminant, or a combination thereof. The composite membranes can be used for membrane distillation of a contaminated brine solution.

10 Claims, 14 Drawing Sheets

(51) Int. Cl.
B01D 67/00 (2006.01)
B01D 69/02 (2006.01)
B01D 71/36 (2006.01)
B01D 71/34 (2006.01)
B01D 71/26 (2006.01)
B01D 61/36 (2006.01)

(52) U.S. Cl.
CPC ......... *B01D 67/0093* (2013.01); *B01D 69/02* (2013.01); *B01D 69/148* (2013.01); *B01D 61/364* (2013.01); *B01D 71/26* (2013.01); *B01D 71/34* (2013.01); *B01D 71/36* (2013.01); *B01D 2311/2669* (2013.01); *B01D 2323/04* (2013.01); *B01D 2323/39* (2013.01); *B01D 2325/02* (2013.01); *B01D 2325/06* (2013.01); *B01D 2325/26* (2013.01); *B01D 2325/38* (2013.01); *B01D 2325/40* (2013.01); *B01D 2325/48* (2013.01)

(56) References Cited

OTHER PUBLICATIONS

Alkhudhiri, et al., "Membrane Distillation: a comprehensive review", Desalination 2012, 287, 2-18.
Al-Obaidani, et al., "Potential of membrane distillation in seawater desalination: Thermal efficiency, sensitivity study and cost estimation", J. Membr. Sci. 2008, 323 (1), 85-98.
Anjali Devi, et al., "Pervaporation separation of isopropanol/water mixtures through crosslinked chitosan membranes", J. Membr. Sci. 2005, 262 (1-2), 91-99.
Banat, et al., "Economic evaluation of desalination by small-scale autonomous solar-powered membrane distillation units", Desalination 2008,220 (1-3), 566-573.
Boo, et al., "Engineering Surface Energy and Nanostructure of Microporous Films for Expanded Membrane Distillation Applications", Environ. Sci. Technol. 2016, 50 (15), 8112-8119.
Boo, et al., "Omniphobic Polyvinylidene Fluoride (PVDF) Membrane for Desalination of Shale Gas Produced Water by Membrane Distillation", Environ. Sci. Technol. 2016, 50 (22), 12275-12282.
Camacho, et al., "Advances in membrane distillation for water desalination and purification applications", Water (Basel, Switz.) 2013, 5(1), 94-196.
Chen, et al., "Surface hydration: Principles and applications toward low-fouling/nonfouling biomate-rials", Polymer 2010,51 (23), 5283-5293.
Chen, et al., "Under-water unidirectional air penetration via a Janus mesh", Chem. Commun. 2015, 59, 11872.
Dow, et al., "Pilot trial of membrane distillation driven by low grade waste heat: Membrane fouling and energy assessment", Desalination 2016, 391, 30-42.
Dudchenko, et al., "Coupling Underwater Superoleophobic Membranes with Magnetic Pickering Emulsions for Fouling-Free Separation of Crude Oil/Water Mixtures: An Experimental and Theoretical Study", ACS Nano 2015, 9 (10), 9930-9941.
Dudchenko, et al., "Frequency-dependent stability of CNT Joule heaters in ionizable media and desalination processes", Nat. Nanotechnol. 2017, 12, 557-563.
Duong, et al., "Membrane distillation and membrane electrolysis of coal seam gas reverse osmosis brine for clean water extraction and NaOH production", Desalination 2016, 397, 108-115.
Gryta, et al., "Membrane distillation of NaCl solution containing natural organic matter", J. Membr. Sci. 2001, 181 (2), 279-287.
Howarter, et al., "Amphiphile grafted membranes for the separation of oil-in-water dispersions", J. Colloid Interface Sci. 2009, 329 (1), 127-132.
Huang, et al., "Coaxially Electrospun Superamphiphobic Silica-based Membrane for Anti-surfactant-wetting Membrane Distillation", Journal of Membrane Science, 2017, 531, 122-128.
Huang, "Novel Janus Membrane for Membrane Distillation with Simultaneous Fouling and Wetting resistance", Environmental Science and Technology, 2017, 51, 13304-13310.
Israelachvili, et al., "The hydrophobic interaction is long range, decaying exponentially with distance", Nature 1982, 300, 341-342.
Kim, et al., "Performance investigation of a solar-assisted direct contact membrane distillation system", J. Membr. Sci. 2013, 427, 345-364.
Kota, et al., "The design and applications of superomniphobic surfaces", NPG Asia Mater. 2014, 6 (7), e109.
Langevin, "Crude Oil Emulsion Properties and their Application to Heavy Oil Transportation", Oil Gas Sci. Technol. 2004, 59, 511.
Lawson, et al., "Membrane distillation", J. Membr. Sci. 1997, 124 (1), 1-25.
Lee, et al., "Development of Omniphobic Desalination Membranes Using a Charged Electrospun Nanofiber Scaffold", ACS Appl. Mater. Interfaces 2016, 8 (17), 11154-11161.
Liao, et al., "Electrospun superhydrophobic membranes with unique structures for membrane distillation", ACS Appl. Mater. Interfaces 2014, 6 (18), 16035-16048.
Lin, et al., "Omniphobic Membrane for Robust Membrane Distillation", Environmental Science & Technology—Letters, 2014, 1(11), 443-447.
Liu, et al., "Bio-inspired superoleophobic and smart materials: Design, fabrication, and application", Progress in Materials Science, 2012, 58, 503.
Liu, et al., "Turning a Surface Superrepellent Even to Completely Wetting Liquids", Science (Washington, DC, U. S.) 2014, 346 (6213), 1096-1100.
Lu, et al., "Hydrophilic Fe2O3 dynamic membrane mitigating fouling of support ceramic membrane in ultrafiltration of oil/water emulsion", Sep. Purif. Technol. 2016, 165, 1-9.
Meyer, et al., "Recent progress in understanding hydrophobic interactions", Proc. Natl. Acad. Sci. U. S. A. 2006, 103 (43), 15739-15746.
Qin, et al., "Synergistic effect of combined colloidal and organic fouling in membrane distillation: measurements and mechanisms", Environ. Sci. Water Res. Technol. 2017, 3, 119-127.
Razmjou, et al., "Superhydrophobic modification of TiO2 nanocomposite PVDF membranes for applications in membrane distillation", J. Membr. Sci. 2012, 415-416, 850-863.
Rinaudo, "Chitin and chitosan: Properties and applications", Prog. Polym. Sci. 2006, 31 (7), 603-632.
Shaffer, et al., "Desalination and reuse of high-salinity shale gas produced water: drivers, technologies, and future directions", Environ. Sci. Technol. 2013, 47 (17), 9569-9583.
Sullivan, et al., "The Effects of Inorganic Solid Particles on Water and Crude Oil Emulsion Stability", Ind. Eng. Chem. Res. 2002, 41, 3389.
Tian, et al., "Droplet and Fluid Gating by Biomimetic Janus Membranes", Adv. Funct. Mater. 2014, 24, 6023.
Tijing, et al., "Fouling and its control in membrane distillation—A review", J. Membr. Sci. 2015, 475, 215-244.
Tiraferri, et al., "Superhydrophilic thin-film composite forward osmosis membranes for organic fouling control: Fouling behavior and antifouling mechanisms", Environ. Sci. Technol. 2012, 46, 11135-11144.
Tong, et al., "The Global Rise of Zero Liquid Discharge for Wastewater Management: Drivers, Technologies, and Future Directions", Environ. Sci. Technol. 2016, 50 (13), 6846-6855.
Tsao, et al., "Long-range attractive force between hydrophobic surfaces observed by atomic force microscopy", Science (Washington, DC, U. S.) 1993, 262 (5133), 547-550.
Tuteja, et al., "Designing superoleophobic surfaces", Science 2007, 318 (5856), 1618-1622.
Tuteja, et al., "Robust omniphobic surfaces", Proc. Natl. Acad. Sci. U. S. A. 2008, 105 (47), 18200-18205.
Wang, et al., "Composite Membrane with Underwater-Oleophobic Surface for Anti-Oil-Fouling Membrane Distillation", Environmental Science & Technology, 2016, 50, 3866-3874.
Wang, et al., "Environmental applications of interfacial materials with special wettability", Environ. Sci. Technol. 2016, 50, 2132-2150.

(56) References Cited

OTHER PUBLICATIONS

Wang, et al., "Membrane Fouling and Wetting in Membrane Distillation and their Mitigation by Novel Membranes with Special Wettability", Water Research, 2017, 112, 38-47.
Wang, et al., "Recent advances in membrane distillation processes: Membrane development, configuration design and application exploring", J. Memb. Sci. 2015, 474, 39.
Wang, et al., "Tailoring surface charge and wetting property for robust oil-fouling mitigation in membrane distillation", Journal of Membrane Science, 2016, 516, 113-122.
Wang, et al., "The Impact of Low-surface-energy Functional Groups on Oil Fouling Resistance in Membrane Distillation", Journal of Membrane Science, 2017, 527, 68-77.
Warsinger, et al., "Scaling and fouling in membrane distillation for desalination applications: A review", Desalination 2015, 356, 294-313.
Wei, et al., "CF4 plasma surface modification of asymmetric hydrophilic polyethersulfone membranes for direct contact membrane distillation", Journal of Membrane Science, 2012, 407-408, 164-175.
Werber, et al., "Materials for next-generation desalination and water purification", Nat. Rev. Mater. 2016, 1, 16018.
Wong, et al., "Interfacial materials with special wettability", Mater. Res. Soc. Bull. 2013, 38, 366.
Wu, et al., "Janus Membranes with Opposing Surface Wettability Enabling Oil-to-Water and Water-to-Oil Emulsification", ACS Appl. Mater. Interfaces 2017, 9, 5062.
Yang, et al., "Janus hollow fiber membrane with a mussel-inspired coating on the lumen surface for direct contact membrane distillation", J. Memb. Sci. 2017, 523, 1.
Yang, et al., "Janus Membranes with Asymmetric Wettability for Fine bubble Aeration", Adv. Mater. Interfaces 2016, 3, 1500774.
Yang, et al., "Janus Membranes: Exploring Duality for Advanced Separation", Angew. Chemie—Int. Ed. 2016, 55, 13398.
Yang, et al., "Superhydrophilic and superoleophobic chitosan-based nanocomposite coatings for oil/water separation", Cellulose 2014, 21 (3), 1851-1857.
Yao, et al., "Applications of Bio-Inspired Special Wettable Surfaces", Adv. Mater. 2011, 23, 719.
Zhang, et al., "Identification of material and physical features of membrane distillation membranes for high performance desalination", J. Membr. Sci. 2010, 349 (1-2), 295-303.
Zhu, et al., "Surfactant-stabilized oil separation from water using ultrafiltration and nanofiltration", J. Membr. Sci. 2017, 529, 159-169.
Zong, et al., "Structure and process relationship of electrospun bioabsorbable nanofiber membranes", Polymer. 2002, 43, 4403.
Zuo, et al., "Novel membrane surface modification to enhance anti-oil fouling property for membrane distillation application", J. Membr. Sci. 2013, 447, 26-35.

* cited by examiner

COMPOSITE MEMBRANES AND METHODS OF MAKING AND USE THEREOF

CROSS-REFERENCE TO RELATED APPLICATIONS

This application claims the benefit of priority to U.S. Provisional Application 62/513,757, filed Jun. 1, 2017, which is hereby incorporated herein by reference in its entirety.

BACKGROUND

The recent development in engineering materials with different wetting properties has advanced membrane-based separations, not only by enhancing the performance of existing technologies, but by enabling new processes that were not feasible with conventional materials. A membrane-based desalination process that can potentially derive significant benefit from engineered materials with special wettability is membrane distillation (MD). In a conventional membrane distillation process, a hydrophobic microporous membrane functions as a barrier for direct liquid permeation, separating the saline and contaminated feed stream from the purified distillate stream. At the same time, the membrane also serves as a medium for vapor transfer driven by temperature-induced trans-membrane partial vapor pressure difference. Because of a variety of technological advantages, including low capital cost and the ability to desalinate hypersaline wastewater using low-grade thermal energy, membrane distillation has been proposed as a potentially promising technology to desalinate challenging hypersaline wastewaters from chemical, textile, pharmaceutical, and oil and gas industries.

However, the use of hydrophobic membranes is a major technical hurdle for membrane distillation to be applied in these areas due to the hydrophobic and amphiphilic contaminants present in those industrial wastewaters. These hydrophobic and amphiphilic contaminants lead to fouling and/or wetting of the hydrophobic membranes, leading to reduced performance of the membranes. Hydrophobic contaminants, such as oil and organic matter, preferentially adhere onto the hydrophobic membrane surface, blocking membrane pores and undermining the membrane function as a medium for vapor transfer. Meanwhile, amphiphilic molecules (e.g., surfactants) reduce the surface tension of the feed solution and render the membrane pores hydrophilic via surface adsorption, leading to wetting of the membrane pores and thereby compromising the membrane function as a barrier to direct liquid permeation.

One option is to pretreat the wastewaters to remove the hydrophobic and amphiphilic contaminants, but such pretreatments are time-consuming and costly. No existing membrane for membrane distillation can simultaneously resist wetting and fouling. The compositions and methods described herein address these and other needs.

SUMMARY

In accordance with the purposes of the disclosed compositions and methods, as embodied and broadly described herein, the disclosed subject matter relates to composite membranes and methods of making and use thereof.

Disclosed herein are composite membranes comprising an omniphobic substrate having a reentrant structure. The omniphobic substrate comprises a plurality of pores, the plurality of pores forming the reentrant structure. The omniphobic substrate further comprises a surface, the surface being coated with a dual functional layer that is hydrophilic in air and oleophobic under water, such that the composite membrane has a top portion and a bottom portion, the top portion comprising the coated surface of the omniphobic substrate, such that the top portion of the composite membrane is hydrophilic in air and oleophobic under water and the bottom portion of the composite membrane is omniphobic.

The omniphobic substrate can, for example, comprise a plurality of polymer fibers. The plurality of polymer fibers can have an average diameter of from 100 nm to 2 μm (e.g., from 160 nm to 210 nm).

The plurality of polymer fibers can, for example, comprise a hydrophobic polymer. In some examples, the plurality of polymer fibers can comprise polypropylene, poly(vinylidene fluoride-co-hexafluoropropylene), polytetrafluoroethylene (PTFE), polyvinylidene fluoride, or a combination thereof. In some examples, the plurality of polymer fibers comprise poly(vinylidene fluoride-co-hexafluoropropylene).

The plurality of polymer fibers can, in some examples, further comprise a surface charge dopant. The surface charge dopant can, for example, comprise cetyltrimethylammonium bromide (CTAB), cetyltrimethylammonium chloride (CTAC), benzalkonium chloride, benzethonium chloride, bronidox, distearyldimethylammonium chloride, tetramethylammonium hydroxide, benzyltriethylammonium, or a combination thereof. In some examples, the surface charge dopant can comprise cetyltrimethylammonium bromide (CTAB).

The omniphobic substrate can, in some examples, comprise a hierarchical reentrant structure. For example, the omniphobic substrate can comprise a plurality of polymer fibers coated with a plurality of particles. The plurality of particles can comprise, for example, a plurality of polystyrene particles, a plurality of silicon dioxide particles (e.g., a plurality of silica particles), a plurality of titanium dioxide particles (e.g., a plurality of titania particles), a plurality of ceramic particles, or a combination thereof. In some examples, the plurality of particles comprise a plurality of silicon dioxide particles. The plurality of particles can, for example, have an average particle size of from 10 nm to 1000 nm. In some examples, the plurality of particles further comprise a low surface energy material. In some examples, the low surface energy material can comprise a fluoroalkylsilane. In some examples, the low surface energy material can comprise 1H,1H,2H,2H-perfluorodecyltriethoxysilane (FDTS). In some examples, the plurality of polymer fibers have a first surface charge and the plurality of particles have a second surface charge, such that the plurality of particles are attached to the plurality of fibers by electrostatic attraction between the first surface charge and the second surface charge.

The dual functional layer can comprise a surface roughness component and a hydrophilic component. In some examples, the dual functional layer can comprise a substantially continuous film with appreciable surface roughness.

The surface roughness component can, for example, comprise a plurality of particles. The plurality of particles can comprise, for example, a plurality of polystyrene particles, a plurality of silicon dioxide particles (e.g., a plurality of silica particles), a plurality of titanium dioxide particles (e.g., a plurality of titania particles), a plurality of ceramic particles, or a combination thereof. In some examples, the plurality of particles comprise a plurality of silicon dioxide particles. The plurality of particles can, for example, have an average particle size of from 10 nm to 1000 nm.

The hydrophilic component can, for example, comprise a hydrophilic polymer. In some examples, the hydrophilic component comprises chitosan, cellulose, derivatives thereof, or combinations thereof. In certain examples, the hydrophilic component comprises chitosan.

The dual functional layer can, in some examples, further comprises a low surface energy material. The low surface energy compound can, for example, comprise a fluorinated compound, such as perfluorooctanoate.

The bottom portion of the composite membrane can, for example, exhibit an in-air sessile drop contact angle with water of 150° or more. In some examples, the top portion of the composite membrane can exhibit an in-air sessile drop contact angle with water of 300 or less. In some examples, the bottom portion of the composite membrane can exhibit an in-air sessile drop contact angle with a 4 mM solution of sodium dodecyl sulfate (SDS) of 140° or more. In some examples, the top portion of the composite membrane can exhibit an in-air sessile drop contact angle with a 4 mM solution of sodium dodecyl sulfate (SDS) of 30° or less. The bottom portion of the composite membrane can, for example, exhibit an in-air sessile drop contact angle with mineral oil of 150° or more. The top portion of the composite membrane can, for example, exhibit an in-air sessile drop contact angle with mineral oil of 60° or less. In some examples, the bottom portion of the composite membrane can exhibit an in-air sessile drop contact angle with ethanol of 90° or more. In some examples, the top portion of the composite membrane can exhibit an in-air sessile drop contact angle with ethanol of 30° or less. The bottom portion of the composite membrane can, for example, exhibit an underwater oil droplet contact angle with mineral oil of 30° or less. The top portion of the composite membrane can, for example, exhibit an underwater oil droplet contact angle with mineral oil of 145° or more.

Also disclosed herein are methods of making the composite membranes described herein. For example, the methods can comprise depositing the dual functional layer on the surface of the omniphobic substrate, such as by spray coating. The methods can, for example, further comprise forming the omniphobic substrate. In some examples, wherein the omniphobic substrate comprises a plurality of polymer fibers, the omniphobic substrate can be formed by electrospinning.

Also disclosed herein are methods of use of the composite membranes disclosed herein. For example, the composite membranes can be used for membrane distillation of a contaminated brine solution. The contaminated brine solution can, for example, comprise a hydrophobic contaminant, an amphiphilic contaminant, or a combination thereof. In some examples, the composite membrane can be antiwetting and antifouling in the presence of the contaminated brine solution. In some examples, the composite membrane exhibits a salt rejection of 99% or more over the course of the membrane distillation.

Additional advantages of the disclosed compositions and methods will be set forth in part in the description which follows, and in part will be obvious from the description. The advantages of the disclosed compositions and methods will be realized and attained by means of the elements and combinations particularly pointed out in the appended claims. It is to be understood that both the foregoing general description and the following detailed description are exemplary and explanatory only and are not restrictive of the disclosed devices and methods, as claimed.

The details of one or more embodiments of the invention are set forth in the accompanying drawings and the description below. Other features, objects, and advantages of the invention will be apparent from the description and drawings, and from the claims.

DESCRIPTION OF FIGURES

The accompanying figures, which are incorporated in and constitute a part of this specification, illustrate several aspects of the disclosure, and together with the description, serve to explain the principles of the disclosure.

FIG. 1A shows the working mechanism of a membrane distillation (MD) process: driven by the temperature difference across the membrane, water evaporates at the feed/membrane interface, transports across the membrane pores as vapor, and condenses at the distillate/membrane interface. The dots in the feed portion represent salts, which are rejected by the membrane. FIG. 1B is an illustration of surfactant-induced wetting in a membrane distillation process: surfactants or amphiphilic contaminants reduce the surface tensions of the feedwater and/or render the membrane distillation membrane hydrophilic, thereby facilitating direct permeation of the feedwater through the pores. FIG. 1C is an illustration of oil fouling in a membrane distillation process: oil droplets attach onto the membrane surface, coalesce, and block the pores for vapor transfer.

FIG. 11, to the right of the dashed line, shows the underwater contact angles for the three surfaces with mineral oil.

DETAILED DESCRIPTION

Figures 1A, 1B, 1C:
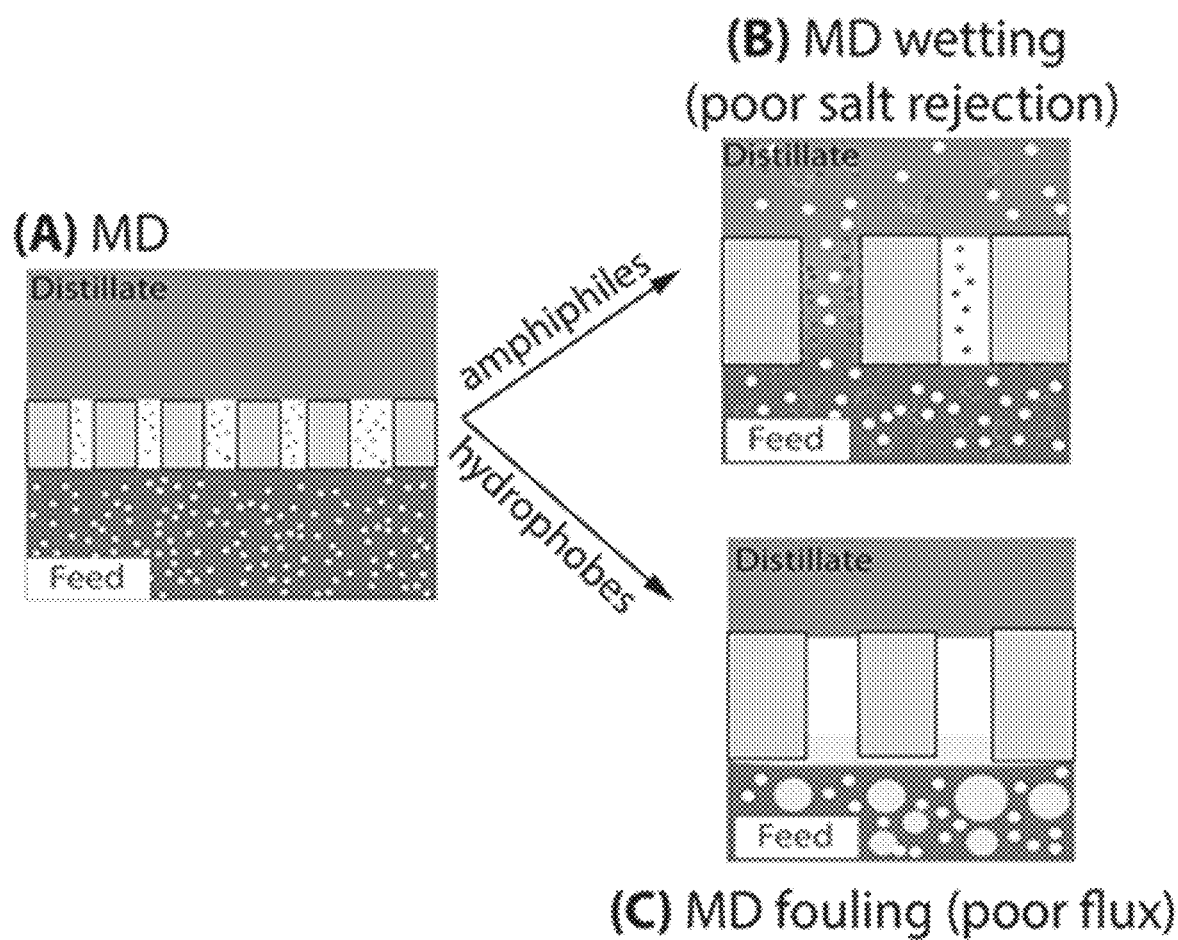
FIG. 1A-FIG. 1C.

Disclosed herein are composite membranes comprising an omniphobic substrate having a reentrant structure. The omniphobic substrate comprises a plurality of pores, the plurality of pores forming the reentrant structure. The omniphobic substrate further comprises a surface, the surface being coated with a dual functional layer that is hydrophilic in air and oleophobic under water, such that the composite membrane has a top portion and a bottom portion, the top portion comprising the coated surface of the omniphobic substrate, such that the top portion of the composite membrane is hydrophilic in air and oleophobic under water and the bottom portion of the composite membrane is omniphobic. As used herein an "omniphobic" material is both hydrophobic (e.g., water repellant) and oleophobic (e.g., oil repellant). For example, the bottom portion of the composite membrane can resist wetting by any liquid: meaning no liquid can wick into the plurality of pores of the bottom portion of the composite membrane.

The omniphobic substrate can comprise a reentrant structure with a low surface energy. In some examples, the reentrant structure can be treated with a low surface energy component, thereby forming the omniphobic substrate.

In some examples, the omniphobic substrate can comprise a porous substrate, wherein the porous substrate comprises a continuous phase permeated by a plurality of pores. For example, the omniphobic substrate can comprise Versapore R® membrane (Pall Corporation).

The plurality of pores of the omniphobic substrate can have an average pore size. As used herein "pore size" refers to the largest cross-sectional dimension of a pore in a plane perpendicular to the longitudinal axis of the pore. The longitudinal axis of the pore refers to the longest axis of a pore. For example, in the case of a substantially cylindrical pore in the omniphobic substrate, the pore size would be the diameter of the pore. The average pore size can be determined, for example, using electron microscopy (e.g., scanning electron microscopy (SEM), scanning transmission electron microscopy (STEM)), Brunauer-Emmett-Teller (BET) measurements, porosimetry, or a combination thereof.

In some examples, the plurality of pores of the omniphobic substrate can have an average pore size of 10 nanometers (nm) or more (e.g., 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 300 nm or more, 350 nm or more, 400 nm or more, 450 nm or more, 500 nm or more, 600 nm or more, 700 nm or more, or 800 nm or more). In some examples, the plurality of pores of the omniphobic substrate can have an average pore size of 1 micrometer (micron, μm) or less (e.g., 900 nm or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, or 20 nm or less). The average pore size of the plurality of pores of the omniphobic substrate can range from any of the minimum values described above to any of the maximum values described above. For example, the plurality of pores of the omniphobic substrate can have an average pore size of from 10 nm to 1 μm (e.g., from 10 nm to 500 nm, from 500 nm to 1 μm, from 10 nm to 200 nm, from 200 nm to 400 nm, from 400 nm to 600 nm, from 600 nm to 800 nm, from 800 nm to 1 μm, or from 20 nm to 900 nm).

In some examples, the plurality of pores of the omniphobic substrate can be substantially monodisperse. "Monodisperse" and "homogeneous size distribution," as used herein, and generally describe a population of pores where all of the pores are the same or nearly the same size. As used herein, a monodisperse distribution refers to pore size distributions in which 80% of the distribution (e.g., 85% of the distribution, 90% of the distribution, or 95% of the distribution) lies within 25% of the mean pore size (e.g., within 20% of the mean pore size, within 15% of the mean pore size, within 10% of the mean pore size, or within 5% of the mean pore size).

The omniphobic substrate can, for example, comprise a plurality of polymer fibers. The plurality of polymer fibers can have an average diameter. "Average diameter" and "mean diameter" are used interchangeably herein, and generally refer to the statistical mean diameter of the polymer fibers in a population of polymer fibers. Mean diameter can be measured using methods known in the art, such as evaluation by scanning electron microscopy, transmission electron microscopy, and/or optical microscopy. In some examples, the plurality of polymer fibers can have an average diameter of 100 nanometers (nm) or more (e.g., 110 nm or more, 120 nm or more, 130 nm or more, 140 nm or more, 150 nm or more, 160 nm or more, 170 nm or more, 180 nm or more, 190 nm or more, 200 nm or more, 210 nm or more, 220 nm or more, 230 nm or more, 240 nm or more, 250 nm or more, 275 nm or more, 300 nm or more, 325 nm or more, 350 nm or more, 400 nm or more, 450 nm or more, 500 nm or more, 600 nm or more, 700 nm or more, 800 nm or more, 900 nm or more, or 1 micrometer ($\mu$m) or more). In some examples, the plurality of polymer fibers can have an average diameter of 2 micrometers ($\mu$m) or less (e.g., 1.75 $\mu$m or less, 1.5 $\mu$m or less, 1.25 $\mu$m or less, 1 $\mu$m or less, 900 nm or less, 800 nm or less, 700 nm or less, 600 nm or less, 500 nm or less, 450 nm or less, 400 nm or less, 350 nm or less, 325 nm or less, 300 nm or less, 275 nm or less, 250 nm or less, 240 nm or less, 230 nm or less, 220 nm or less, 210 nm or less, 200 nm or less, 190 nm or less, 180 nm or less, 170 nm or less, 160 nm or less, or 150 nm or less). The average diameter of the plurality of polymer fibers can range from any of the minimum values described above to any of the maximum values described above. For example, the plurality of polymer fibers can have an average diameter of from 100 nm to 2 $\mu$m (e.g., from 100 nm to 500 nm, from 500 nm to 2 $\mu$m, from 100 nm to 250 nm, from 250 nm to 500 nm, from 500 nm to 750 nm, from 750 nm to 1 $\mu$m, from 1 $\mu$m to 1.5 $\mu$m, from 1.5 $\mu$m to 2 $\mu$m, from 200 nm to 1 $\mu$m, or from 160 nm to 210 nm).

The plurality of polymer fibers can, for example, comprise a hydrophobic polymer. Examples of suitable polymers include, but are not limited to, polyolefins (e.g., polypropylene, polyethylene, polyisobutylene, polymethylpentene, polybutylene, ethylene propylene rubber, and ethylene propylene diene monomer rubber), polycarbonates, polyesters (e.g., polyglycolic acid, polylactic acid, polycaprolactone, polyhydroxyalkanoates, polyethylene terephthalate (PET), polybutylene terephthalate, polytrimethylene terephthalate, and polyethylene naphthalate), polyurethanes, polyamides (e.g., Nylon), polystyrene, polyacrylates, ABS (acrylonitrile butadiene styrene copolymers), vinyl polymers (e.g., polyvinyl chloride), copolymers thereof, and blends thereof. In some examples, the plurality of polymer fibers can comprise a hydrophilic polymer that has been rendered hydrophobic by $CF_4$ plasma treatment, as described, for example, in Wei et al. *Journal of Membrane Science*, 2012, 407-408, p. 164-175, which is hereby incorporated herein by references for its teaching of $CF_4$ plasma treatment of hydrophilic polymers to render them hydrophobic. In some examples, the plurality of polymer fibers can comprise heptadecafluorohexyl-trimethoxysilane, polyhexafluoropropylene, polytetrafluoroethylene, octadecyltrichlorosilane, nonfluorohexyl-trimethoxysilane, polyvinylidene chloride, polyethylene, polypropylene, polvemethylmethacrylate, polystyrene, polyvinylidene chloride, polyester, polyethylene terephthalate, epoxypolyamide. In some examples, the plurality of polymer fibers can comprise poly(vinylidene fluoride-co-hexafluoropropylene), polytetrafluoroethylene (PTFE), polyvinylidene fluoride, or a combination thereof. In some examples, the plurality of polymer fibers comprise poly(vinylidene fluoride-co-hexafluoropropylene).

The plurality of polymer fibers can, in some examples, further comprise a surface charge dopant. The surface charge dopant can modify the surface charge of the plurality of polymer fibers. The surface charge dopant can, for example, comprise cetyltrimethylammonium bromide (CTAB), cetyltrimethylammonium chloride (CTAC), benzalkonium chloride, benzethonium chloride, bronidox, distearyldimethylammonium chloride, tetramethylammonium hydroxide, benzyltriethylammonium, or a combination thereof. In some examples, the surface charge dopant can comprise cetyltrimethylammonium bromide (CTAB).

The omniphobic substrate can, in some examples, comprise a hierarchical reentrant structure. For example, the omniphobic substrate can comprise a plurality of polymer fibers coated with a plurality of particles. The plurality of particles can comprise particles of any suitable type and size.

In some examples, the plurality of particles can comprise a plurality of hydrophilic particles. In some cases when the plurality of particles comprise a plurality of hydrophilic particles, the plurality of polymer fibers can comprise a hydrophobic polymer.

The plurality of particles can comprise, for example, a plurality of polystyrene particles, a plurality of silicon dioxide particles (e.g., a plurality of silica particles), a plurality of titanium dioxide particles (e.g., a plurality of titania particles), a plurality of ceramic particles, or a combination thereof. In some examples, the plurality of particles comprise a plurality of silicon dioxide particles.

The plurality of particles can have an average particle size. "Average particle size" and "mean particle size" are used interchangeably herein, and generally refer to the statistical mean particle size of the particles in a population of particles. For example, the average particle size for a plurality of particles with a substantially spherical shape can comprise the average diameter of the plurality of particles. For a particle with a substantially spherical shape, the diameter of a particle can refer, for example, to the hydrodynamic diameter. As used herein, the hydrodynamic diameter of a particle can refer to the largest linear distance between two points on the surface of the particle. For an anisotropic particle, the average particle size can refer to, for example, the average maximum dimension of the particle (e.g., the length of a rod shaped particle, the diagonal of a cube shape particle, the bisector of a triangular shaped particle, etc.) For an anisotropic particle, the average particle size can refer to, for example, the hydrodynamic size of the particle. Mean particle size can be measured using methods known in the art, such as evaluation by scanning electron microscopy, transmission electron microscopy, and/or dynamic light scattering.

The plurality of particles can, for example, have an average particle size of 10 nm or more (e.g., 11 nm or more, 12 nm or more, 13 nm or more, 14 nm or more, 15 nm or more, 16 nm or more, 17 nm or more, 18 nm or more, 19 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 300 nm or more, 350 nm or more, 400 nm or more, 450 nm or more, 500 nm or more, 600 nm or more, 700 nm or more, 800 nm or more, or 900 nm or more). In some examples, the plurality of particles can have an average particle size of 1000 nm or less (e.g., 900 nm or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, 19 nm or less, 18 nm or less, 17 nm or less, 16 nm or less, or 15 nm or less). The average particle size of the plurality of particles can range from any of the minimum values described above to any of the maximum values described above. For example, the plurality of particles can have an average particle size of from 10 nm to 1000 nm (e.g., from 10 nm to 500 nm, from 500 nm to 1000 nm, from 10 nm to 200 nm, from 200 nm to 400 nm, from 400 nm to 600 nm, for 600 nm to 800 nm, from 800 nm to 1000 nm, from 10 nm to 100 nm, from 10 nm to 50 nm, or from 10 nm to 30 nm).

In some examples, the plurality of particles can be substantially monodisperse. "Monodisperse" and "homogeneous size distribution," as used herein, and generally describe a population of particles where all of the particles are the same or nearly the same size. As used herein, a monodisperse distribution refers to particle distributions in which 80% of the distribution (e.g., 85% of the distribution, 90% of the distribution, or 95% of the distribution) lies within 25% of the mean particle size (e.g., within 20% of the mean particle size, within 15% of the mean particle size, within 10% of the mean particle size, or within 5% of the mean particle size).

The plurality of particles can comprise particles of any shape (e.g., a sphere, a rod, a quadrilateral, an ellipse, a triangle, a polygon, etc.). In some examples, the plurality of particles can have an isotropic shape. In some examples, the plurality of particles are substantially spherical.

In some examples, the plurality of particles can comprise: a first population of particles comprising a first material and having a first average particle size and a first particle shape; and a second population of particles comprising a second material and having a second average particle size and a second particle shape; wherein the first average particle size and the second average particle size are different, the first particle shape and the second particle shape are different, the first material and the second material are different, or a combination thereof. In some examples, the plurality of particles can comprise a mixture of a plurality of populations of particles, wherein each population of particles within the mixture has a different size, shape, composition, or combination thereof.

In some examples, the plurality of particles further comprise a low surface energy material. The low surface energy material can comprise, for example, a fluorinated material, such as a fluorosilane, a fluorosurfactant, or a combination thereof. In some examples, the low surface energy material can include a silane. The silane can be halogenated or non-halogenated. In some examples, the silane can comprise an alkyl chain, a partially fluorinated alkyl chain, and/or an alkyl chain that has regions that are perfluorinated, any of which may be straight or branched. In some examples, the silane group can comprise one or more perfluorinated aliphatic moieties. In certain examples, the low surface energy material can comprise a fluorosilane. In some examples, the low surface energy material can comprise a fluoroalkylsilane.

In some examples, the low surface energy material can comprise perfluoroalkyltrichlorosilane, perfluoroalkyl(alkyl)dichlorosilane, perfluoroalkyl(alkyl)dialkoxylsilanes, or perfluoroalkyltrialkoxysilanes. Specifically, the low surface energy material can comprise perfluorododecyltrichlorosilane, perfluorotetradecyltrichlorosilane, perfluorooctyltrichlorosilane, perfluorodecyltrimethoxysilane, perfluorododecyltrimethoxysilane, perfluorotetradecyltrimethoxtsilane, perfluorooctyltrimethoxysilane, perfluorodecyltriethoxysilane, perfluorododecyltrimethoxvsilane, perfluorotetradecyltriethoxvsilane, perfluorooctyltrimethoxysilane, perfluorodecylmethyldichlorosilane, or a combination thereof. In some examples, the low surface energy material can comprise 1H,1H,2H,2H-perfluorodecyltriethoxysilane (FDTS).

In some examples, the low surface energy material can include a fluorosurfactant. Suitable fluorosurfactants can include anionic fluorosurfactants and cationic fluorosurfactants. Examples of suitable fluorosurfactants include those sold under the tradenames FLEXIPEL™, ZONYL®, CAPSTONE®, and MASURF®. Specific examples of suitable fluorosurfactants include FLEXIPEL™ AM-101 partially fluorinated polymer, ZONYL® 9361 anionic fluorosurfactant, CAPSTONE® FS-50 anionic fluorosurfactant, CAPSTONE® FS-63 anionic fluorosurfactant, MASURF® FP-815CP anionic fluoroacrylate copolymer, and perfluorooctanoate.

The plurality of particles can be attached to the plurality of polymer fibers by any known method. In some examples, the plurality of polymer fibers have a first surface charge and the plurality of particles have a second surface charge, such that the plurality of particles are attached to the plurality of fibers by electrostatic attraction between the first surface charge and the second surface charge.

The dual functional layer can comprise a surface roughness component and a hydrophilic component. In some examples, the dual functional layer can comprise a substantially continuous film with appreciable surface roughness. For example, the dual functional layer can comprise a substantially continuous film comprising the hydrophilic component with the surface roughness component dispersed therein.

The surface roughness component can, for example, comprise a plurality of particles. The plurality of particles can comprise, for example, a plurality of polystyrene particles, a plurality of silicon dioxide particles (e.g., a plurality of silica particles), a plurality of titanium dioxide particles (e.g., a plurality of titania particles), a plurality of ceramic particles, or a combination thereof. In some examples, the plurality of particles comprise a plurality of silicon dioxide particles. The plurality of particles can, for example, have an average particle size of 10 nm or more (e.g., 11 nm or more, 12 nm or more, 13 nm or more, 14 nm or more, 15 nm or more, 16 nm or more, 17 nm or more, 18 nm or more, 19 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200) nm or more, 225 nm or more, 250 nm or more, 300 nm or more, 350 nm or more, 400 nm or more, 450 nm or more, 500 nm or more, 600 nm or more, 700 nm or more, 800 nm or more, or 900 nm or more). In some examples, the plurality of particles can have an average particle size of 1000 nm or less (e.g., 900 nm or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, 19 nm or less, 18 nm or less, 17 nm or less, 16 nm or less, or 15 nm or less). The average particle size of the plurality of particles can range from any of the minimum values described above to any of the maximum values described above. For example, the plurality of particles can have an average particle size of from 10 nm to 1000 nm (e.g., from 10 nm to 500 nm, from 500) nm to 1000 nm, from 10 nm to 200 nm, from 200 nm to 400 nm, from 400 nm to 600 nm, for 600 nm to 800 nm, from 800 nm to 1000 nm, from 10 nm to 100 nm, from 10 nm to 50 nm, or from 10 nm to 30 nm).

The hydrophilic component can, for example, comprise a hydrophilic polymer. Examples of hydrophilic polymers include, but are not limited to, poly(N-isopropylacrylamide) (PNIPAM), polyacrylamide (PAM), poly(2-oxazoline), polyethyleneimine (PEI), poly(acrylic acid) (PAA), polymethacrylate, poly(ethylene glycol), poly(ethylene oxide), poly(vinyl alcohol) (PVA), poly(vinylpyrrolidone) (PVP), polydopamine, poly(diallyldimethylammonium chloride), poly(3,4-ethylenedioxythiophene) polystyrene sulfonate, polyethers, copolymers of maleic anhydride, chitosan, cellulose, derivatives thereof, and combinations thereof. In some examples, the hydrophilic component can comprise a hydrogel. In some examples, the hydrophilic component comprises chitosan, cellulose, derivatives thereof, or combinations thereof. In certain examples, the hydrophilic component comprises chitosan.

The dual functional layer can, in some examples, further comprise a plurality of pores. For example, the dual functional layer can comprise a substantially continuous film comprising the hydrophilic component with the surface roughness component dispersed therein, wherein the substantially continuous film is permeated by the plurality of pores.

The plurality of pores of the dual functional layer can have an average pore size of 10 nanometers (nm) or more (e.g., 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 300 nm or more, 350 nm or more, 400 nm or more, 450 nm or more, 500 nm or more, 600 nm or more, 700 nm or more, or 800 nm or more). In some examples, the plurality of pores of the dual functional layer can have an average pore size of 1 micrometer (micron, μm) or less (e.g., 900 nm or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, or 20 nm or less). The average pore size of the plurality of pores of the dual functional layer can range from any of the minimum values described above to any of the maximum values described above. For example, the plurality of pores of the dual functional layer can have an average pore size of from 10 nm to 1 μm (e.g., from 10 nm to 500 nm, from 500 nm to 1 μm, from 10 nm to 200 nm, from 200 nm 10 to 400 nm, from 400 nm to 600 nm, from 600 nm to 800 nm, from 800 nm to 1 μm, or from 20 nm to 900 nm).

In some examples, the plurality of pores of the omniphobic substrate can be substantially monodisperse. "Monodisperse" and "homogeneous size distribution," as used herein, and generally describe a population of pores where all of the pores are the same or nearly the same size. As used herein, a monodisperse distribution refers to pore size distributions in which 80% of the distribution (e.g., 85% of the distribution, 90% of the distribution, or 95% of the distribution) lies within 25% of the mean pore size (e.g., within 20% of the mean pore size, within 15% of the mean pore size, within 10% of the mean pore size, or within 5% of the mean pore size).

The dual functional layer can, in some examples, further comprises a low surface energy material, such as perfluorooctanoate.

The top portion of the composite membrane, comprising the coated surface of the omniphobic substrate, is hydrophilic in air and oleophobic under water while the bottom portion of the composite membrane is omniphobic. Accordingly, the top portion and the bottom portion of the composite membrane can exhibit different wetting properties, for example as determined by the in-air sessile drop contact angle and/or underwater oil droplet contact angle.

The bottom portion of the composite membrane can, for example, exhibit an in-air sessile drop contact angle with water of 150° or more (e.g., 151° or more, 152° or more, 153° or more, 154° or more, 155° or more, 156° or more, 157° or more, 158° or more, 159° or more, 160° or more, 161° or more, 162° or more, 163° or more, 164° or more, or 165° or more).

In some examples, the top portion of the composite membrane can exhibit an in-air sessile drop contact angle with water of 30° or less (e.g., 29° or less, 28° or less, 27° or less, 26° or less, 25° or less, 24° or less, 23° or less, 22° or less, 21° or less, 20° or less, 19° or less, 18° or less, 17° or less, 16° or less, 15° or less, 14° or less, 13° or less, 12° or less, 11° or less, 10° or less, 9° or less, 8° or less, 7° or less, 6° or less, or 5° or less).

In some examples, the bottom portion of the composite membrane can exhibit an in-air sessile drop contact angle with a 4 mM solution of sodium dodecyl sulfate (SDS) of 140° or more (e.g., 141° or more, 142° or more, 143° or more, 144° or more, 145° or more, 146° or more, 147° or more, 148° or more, 149° or more, 150° or more, 151° or more, 152° or more, 153° or more, 154° or more, 155° or more, 156° or more, 157° or more, 158° or more, 159° or more, 160° or more, 161° or more, 162° or more, 163° or more, 164° or more, or 165° or more).

In some examples, the top portion of the composite membrane can exhibit an in-air sessile drop contact angle with a 4 mM solution of sodium dodecyl sulfate (SDS) of 30° or less (e.g., 29° or less, 28° or less, 27° or less, 26° or less, 25° or less, 24° or less, 23° or less, 22° or less, 21° or less, 20° or less, 19° or less, 18° or less, 17° or less, 16° or less, 15° or less, 14' or less, 13° or less, 12° or less, 11° or less, 10° or less, 9° or less, 8° or less, 7° or less, 6° or less, or 5° or less).

The bottom portion of the composite membrane can, for example, exhibit an in-air sessile drop contact angle with mineral oil of 150° or more (e.g., 151° or more, 152° or more, 153° or more, 154° or more, 155° or more, 156° or more, 157° or more, 158° or more, 159° or more, 160° or more, 161° or more, 162° or more, 163° or more, 164° or more, or 165° or more).

The top portion of the composite membrane can, for example, exhibit an in-air sessile drop contact angle with mineral oil of 60° or less (e.g., 55° or less, 50° or less, 45° or less, 40° or less, 35° or less, 30° or less, 25° or less, 20° or less, 15° or less, 10° or less, or 5° or less).

In some examples, the bottom portion of the composite membrane can exhibit an in-air sessile drop contact angle with ethanol of 90° or more (e.g., 95° or more, 100° or more, 105° or more, 110° or more, 115° or more, 120° or more, 125° or more, 130° or more, 135° or more, 140° or more, or 150° or more).

In some examples, the top portion of the composite membrane can exhibit an in-air sessile drop contact angle with ethanol of 30° or less (e.g., 29° or less, 28° or less, 27° or less, 26° or less, 25° or less, 24° or less, 230 or less, 22° or less, 21° or less, 20° or less, 19° or less, 18° or less, 17° or less, 16° or less, 15° or less, 14° or less, 13° or less, 12° or less, 11° or less, 10° or less, 9° or less, 8° or less, 7° or less, 6° or less, or 5° or less).

The bottom portion of the composite membrane can, for example, exhibit an underwater oil droplet contact angle with mineral oil of 30° or less (e.g., 29° or less, 28° or less, 27° or less, 26° or less, 25° or less, 24° or less, 23° or less, 22° or less, 21° or less, 20° or less, 19° or less, 18° or less, 17° or less, 16° or less, 15° or less, 14° or less, 13° or less, 12° or less, 11° or less, 10° or less, 9° or less, 8° or less, 7° or less, 6° or less, or 5° or less).

The top portion of the composite membrane can, for example, exhibit an underwater oil droplet contact angle with mineral oil of 145° or more (e.g., 146° or more, 147° or more, 148° or more, 149° or more, 150° or more, 151° or more, 152° or more, 153° or more, 154° or more, 155° or more, 156° or more, 157° or more, 158° or more, 159° or more, 160° or more, 161° or more, 162° or more, 163° or more, 164° or more, or 165° or more).

The composite membrane can, for example, be antiwetting and/or antifouling.

Also disclosed herein are methods of making the composite membranes described herein. For example, the methods can comprise depositing the dual functional layer on the surface of the omniphobic substrate. Depositing the dual functional layer can comprise, for example, printing, spin coating, drop-casting, zone casting, dip coating, blade coating, spray coating, vacuum filtration, electrospinning, electrospraying, or combinations thereof. In some examples, depositing the dual functional layer comprises spray coating.

The methods can, for example, further comprise forming the omniphobic substrate. In some examples, wherein the omniphobic substrate comprises a plurality of polymer fibers, the omniphobic substrate can be formed by any method of forming fibers known in the art. For example, the omniphobic substrate can be formed by electrospinning, wet jet fiber pulling, melt blowing, wet spinning, dry spinning, fiber drawing, phase inversion, polymer stretching, or combinations thereof. In some examples, the omniphobic substrate can be formed by electrospinning the plurality of polymer fibers.

Also disclosed herein are methods of use of the composite membranes disclosed herein. For example, the composite membranes can be used for membrane distillation of a contaminated brine solution. The contaminated brine solution can, for example, comprise a hydrophobic contaminant, an amphiphilic contaminant, or a combination thereof. In some examples, the composite membrane can be antiwetting and antifouling in the presence of the contaminate brine solution. In some examples, the composite membrane can exhibit a normalized water flux of from 0.9 to 1.1 over the course of the membrane distillation (e.g., the composite membrane exhibits a stable time-dependent water flux). In some examples, the composite membrane exhibits a salt rejection of 99% or more over the course of the membrane distillation (e.g., 99.1% or more, 99.2% or more, 99.3% or more, 99.4% or more, 99.5% or more, 99.6% or more, 99.7% or more, 99.8% or more, or 99.9% or more).

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1

Membrane distillation (MD), a membrane based thermal distillation process capable of utilizing low-grade thermal energy to desalinate hypersaline brine water, has been proposed as a promising candidate for treating reverse osmosis (RO) brine, highly saline industrial wastewater, and wastewater from unconventional energy production. In a membrane distillation process, the transport of water vapor from the hot, saline solution (feed solution) to the cold distilled water (distillate) is driven by the temperature difference-induced partial vapor pressure difference across the membrane (Lawson K W et al. *J. Membr. Sci.* 1997, 124 (1), 1-25). A typical membrane distillation membrane is hydrophobic and has micron-sized or submicron-sized pores (FIG. 1A). This hydrophobic microporous structure of membrane distillation membranes serves two roles in a membrane distillation process. First, the membrane prevents the direct liquid permeation of the salty feed solution through the pores and into the distillate, which is required for the membrane distillation process to have a high salt rejection (typically 99.9% or higher). As it is significantly more challenging for water to permeate through a hydrophobic pore than through a hydrophilic pore of the same size, this nonwetting condition typically results in hydrophobic materials being used. The second function of the membrane in membrane distillation is to provide a medium for efficient vapor transfer, which means the membranes should have reasonably high porosity among other structural requirements.

The most typical membranes in existing membrane distillation studies are made of common hydrophobic materials that can be readily processed into microporous membranes (Zhang J et al. *J. Membr. Sci.* 2010, 349 (1-2), 295-303). Membrane distillation membranes made of these materials function reasonably well with relatively "clean" feed waters such as seawater, reverse osmosis brine, and industrial wastewater that contain mostly salt. However, when used to treat challenging feed waters, such as wastewater from industries and unconventional energy production sources, conventional hydrophobic materials fail for two major reasons: wetting and fouling (Wang Z et al. *Water Res.* 2017, 112, 38-47; Tijing L D et al. *J. Membr. Sci.* 2015, 475, 215-244).

The first problem is membrane wetting facilitated by the presence of amphiphilic contaminants, such as surfactants, in the feedwater. These amphiphilic agents reduce the surface tension of the feedwater and thereby reduce the liquid entry pressure (LEP). Another possible mechanism for surfactants-induced wetting in membrane distillation is by rendering the membrane hydrophilic via surface adsorption of surfactants. The result of membrane wetting is reduced salt rejection due to the direct permeation of feed solution to the distillate (FIG. 1B). The second problem is membrane fouling by hydrophobic contaminants (foulants). Because of the attractive hydrophobic interaction, hydrophobic foulants (e.g., oil droplets) tend to attach onto the hydrophobic membrane surface and possibly wick into the pores, thereby blocking the membrane pores and eliminating the medium for vapor transfer (FIG. 1C).

Membrane distillation membranes with special wetting properties have been developed to overcome the problems of fouling and wetting in membrane distillation (Wang Z et al. *Water Res.* 2017, 112, 38-47). Specifically, omniphobic membranes, membranes that are resistant to wetting by both oil and water droplets in air, have been developed to mitigate membrane distillation wetting induced by surfactants. It has been suggested that the reentrant structure that imparts the in-air omniphobicity is also responsible for maintaining the Cassie-Baxter state needed for wetting resistance of an omniphobic membrane (Lin S et al. *Environ. Sci. Technol. Lett.* 2014, 1 (11), 443-447: Boo C et al. *Environ. Sci. Technol.* 2016, 50 (15), 8112-8119; Lee J et al. *ACS Appl. Mater. Interfaces* 2016, 8 (17), 11154-11161). On the other hand, it has been found that modifying a conventional hydrophobic membrane distillation membrane with an in-air hydrophilic surface coating, such as a hydrogel, can mitigate fouling by oil droplets in membrane distillation operations with oily feed solution (Zuo G et al. *J. Membr. Sci.* 2013, 447, 26-35; Wang Z et al. *Environ. Sci. Technol.* 2016, 50, 2132-2150; Wang Z et al. *J. Membr. Sci.* 2017, 527, 68-77; Wang Z et al. *J. Membr. Sci.* 2016, 516, 113-122). The in-air hydrophilic coating is underwater oleophobic, deterring oil droplets from attaching to and spreading on the membrane surface and preventing them from blocking the pores of the underlying hydrophobic membrane.

However, to date, no membrane exists that can simultaneously resist wetting and fouling. An omniphobic membrane, which has shown to resist surfactant wetting, is actually underwater oleophilic. Oil droplets in feed readily fouled an omniphobic membrane and reduced water vapor flux by blocking the membrane pores (Wang Z et al. *Water Res.* 2017, 112, 38-47). On the other hand, a composite membrane with an in-air hydrophilic surface, which is fouling resistant, failed to mitigate membrane wetting by surfactants. Small amphiphilic molecules can readily penetrate the skin layer and impart a detrimental impact on the hydrophobic substrate. The development of a membrane that is simultaneously resistant to wetting and fouling can enable membrane distillation to become universally applicable in desalinating hypersaline wastewater with complex compositions.

Herein, a Janus membrane is discussed. The Janus membrane was developed by integrating an omniphobic substrate and an in-air hydrophilic and underwater oleophobic skin layer. Hereafter, such a Janus membrane based on an omniphobic substrate will be called Janus(o) membrane, whereas a Janus membrane based on a hydrophobic substrate will be named Janus(h) membrane. The name "Janus membrane" suggests dual or asymmetric wetting properties of the two surfaces of a membrane. The Janus(o) membrane has dual wettability as a high-performance membrane for membrane distillation, thereby enabling membrane distillation to treat hypersaline wastewater rich in amphiphilic and hydrophobic constituents.

Figure 2:
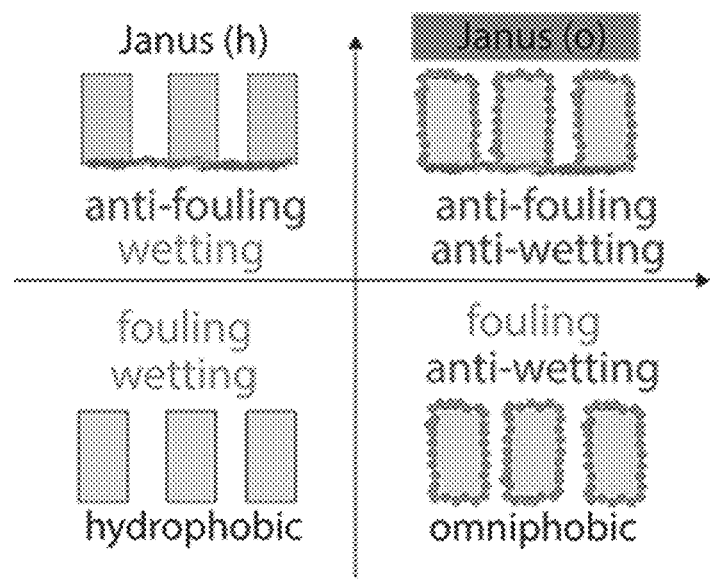
FIG. 2 is an illustration of the hypothesis that only a Janus membrane with an omniphobic substrate (i.e., a Janus(o) membrane) can achieve simultaneous fouling and wetting resistance.

The strategy for designing a membrane for membrane distillation with simultaneous wetting and fouling resistance is summarized schematically in FIG. 2. A membrane with an omniphobic substrate and surface that is hydrophilic in air and oleophobic under water can be simultaneously resistant to both wetting and fouling. An omniphobic substrate, with a hierarchical reentrant structure, prevents wetting of the feed solution with reduced surface tension. On the other hand, a hydrophilic surface coating is underwater oleophobic via the formation of a hydration layer, as it is thermodynamically unfavorable for hydrophobic contaminants (e.g., oil) to spread on and penetrate through such a hydrated surface coating layer. As shown in FIG. 2, a Janus membrane with a hydrophobic substrate (denoted as Janus (h) in FIG. 2, with (h) standing for "hydrophobic") only resists fouling by hydrophobes but not wetting by amphiphilic agents. By integrating the unique functionalities of the two constituting layers, the Janus(o) membrane outperformed the Janus(h), omniphobic, and hydrophobic membranes as only the Janus (o) membrane was resistant to both oil fouling and surfactant wetting (FIG. 2).

Materials and Chemicals.

Poly(vinylidene fluoride-co-hexafluoropropylene) (PVDF-HFP, $M_w \approx 455\,000$), silica nanoparticles (SiNPs, Ludox HS-40), fluorinated alkyl silane (FAS, 97%), sodium dodecyl sulfate (SDS, 99%), perfluorooctanoic acid, sodium hydroxide (NaOH), sodium chloride (NaCl), cetyltrimethylammonium bromide (CTAB, 98%), acetic acid (>99%), N,N-dimethylformamide (DMF, 99.8%), acetone (99.9%), and mineral oil were purchased from Sigma-Aldrich and used without purification. Chitosan (CTS, 90% Deacetylated) was obtained from Chemsavers (Bluefield, W. Va.). Crude oil was acquired from Texas Raw Crude Oil (Midland, Tex.).

Design of the Janus(o) Membrane and Reference Membranes.

Figure 3:
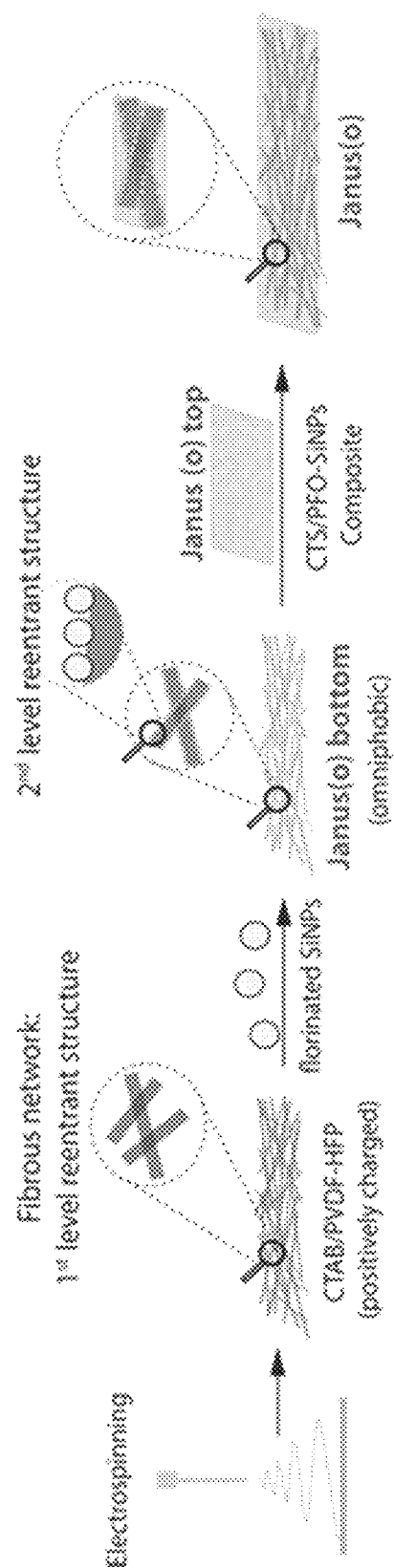
FIG. 3 illustrates the fabrication procedure of the Janus(o) membrane. The first step involves electrospinning a fibrous substrate of CTAB/PVDF-HFP; the second step involves adsorption of SiNPs followed by surface fluorination; in the last step, a CTS/PFO-SiNPs nanoparticle-polymer composite coating was applied onto the omniphobic substrate.

To fabricate the Janus(o) membrane (FIG. 3), a positively charged electrospun fibrous substrate of CTAB/PVDF-HFP was first created. The fibrous substrate was then decorated with fluorinated SiNPs, first by adsorption of negatively charged SiNPs onto the fibrous substrate using dip coating followed by fluorination using chemical vapor deposition. The presence of silica nanoparticles on the membrane scaffold created local reentrant structure that enhanced the omniphobicity (Kota A K et al. *NPG Asia Mater.* 2014, 6, e109). The resulting fibrous network was in-air omniphobic. Lastly, a layer of nanoparticle polymer composite made of SiNPs, chitosan (CTS), and perfluorooctanoate (PFO), SiNPs-CTS/PFO, was applied onto the omniphobic substrate using spray coating. The final product of such a three-step fabrication was the Janus(o) membrane with an omniphobic substrate and an in-air hydrophilic skin.

Three other membranes listed in FIG. 2 were also fabricated as the reference membranes for comparison in membrane distillation fouling and wetting experiments. The hydrophobic membrane was obtained by electrospinning a PVDF-HFP fibrous network. The Janus(h) membrane was fabricated by applying the SiNPs-CTS/PFO composite coating onto a hydrophobic PVDF-HFP membrane. The synthesis of the omniphobic membrane followed the same procedure as that for the Janus(o) membrane, but without the last step of applying the SiNPs-CTS/PFO composite surface coating.

Electrospinning of Fibrous Substrate.

Two types of electrospun fibrous membrane substrates were prepared using electrospinning. The first was the negatively charged PVDF-HFP substrate. This PVDF-HFP substrate was later used as a reference hydrophobic membrane and for fabricating the Janus(h) membrane. Both membranes were used as references in testing the performance of the Janus(o) membrane.

The second type of electrospun fibrous substrate was made of CTAB impregnated PVDF-HFP (CTAB PVDF-HFP). This CTAB/PVDF-HFP substrate was positively charged to facilitate the adsorption of SiNPs that were used to impart omniphobicity. The CTAB/PVDF-HFP substrate was employed to fabricate the omniphobic membrane and the Janus(o) membrane.

To prepare the dope solution for electrospinning, 2.8 g of PVDF-HFP was dissolved in a mixed solvent containing 9.8 g of DMF and 4.2 g of acetone. CTAB/PVDF-HFP solution was prepared by adding 50 mg of CTAB to the above PVDF-HFP solution. These solutions were stirred in a 45° C. water bath for 20 h. Electrospinning was conducted using a commercial electrospinning instrument with a rotating drum collector (TL-01, Tongli Tech., China), with the temperature maintained at 30° C. For electrospinning of PVDF-HFP, 6 mL of PVDF-HFP solution was fed at 1.0 mL $h^{-1}$ using a syringe pump with an applied voltage of 10 kV. The electrospun fibrous scaffolds were collected onto an aluminum foil covering the grounded stainless drum with a rotating speed of 150 rpm. For electrospinning of CTAB/PVDF-HFP, the same parameters were used except that the applied voltage was 16 kV. When fabricating the Janus membrane, 5.5 mL of CTAB/PVDF-HFP was first electrospun, and then 0.5 mL of PVDF-HFP was spun on the surface of CTAB/PVDF-HFP. This two-layer substrate was created to facilitate the attachment of the hydrophilic coating layer onto the substrate, as coating adhesion onto the omniphobic substrate is significantly more challenging than onto a hydrophobic substrate. In all cases, the electrospun membranes have sufficient mechanical strength and maintained their integrity during all membrane distillation experiments.

SiNPs Adsorption and Surface Fluorination.

The adsorption of SiNPs onto the CTAB/PVDF-HFP substrate was achieved using a dip-coating method. The CTAB/PVDF-HFP substrate was first wetted by a 20% ethanol solution, followed by washing with deionized (DI) water to remove the ethanol. The wetted CTAB/PVDF-HFP substrate was then submerged into a suspension of 0.04% (mass to volume) SiNPs (pH 6.1) for 1 h. After dip-coating, the substrate was gently rinsed with DI water and dried in air. The fluorination of the SiNPs was achieved using chemical vapor deposition by exposing the SiNPs coated substrate to 0.15 mL of FAS in vacuum at 100° C. for 24 h.

CTS/PFO Composite Preparation and Coating.

The CTS/PFO coating was prepared by dropwise addition of 0.1 M aqueous solution of perfluorooctanoate (PFO), obtained from the reaction of perfluorooctanonic acid with NaOH, into a dispersion of chitosan (CTS) and SiNPs mixture (0.2 g of CTS and 0.3 g of SiNPs in 100 mL of 1% acetic acid solution) under vigorous stirring (Wang Z et al. *Environ. Sci. Technol.* 2016, 50 (7), 3866-3874; Yang J et al. *Cellulose* 2014, 21 (3), 1851-1857). After being rinsed with DI water and dried in air, 0.3 g of the prepared SiNPs-CTS/PFO coating was dispersed in 20 mL of ethanol using bath sonication to obtain the coating dispersion. This SiNPs-CTS/PFO antifouling skin layer was applied onto the electrospun substrate via spraying using a pressurized air-driven spray gun with an operation pressure of 0.2 MPa followed by heat treatment at 80° C. for 1 h. Such a coating layer was applied to the omniphobic substrate (with a thin PVDF-HFP skin layer) for fabricating the Janus(o) membrane and to the PVDF-HFP substrate to prepare the Janus(h) membrane.

Membrane Characterizations.

Membrane morphology was characterized using scanning electron microscopy (SEM, Zeiss Merlin). The ζ-potential was measured using a streaming potential analyzer (SurPASS, Anton Paar, Ashland, Va.) with an adjustable gap cell. The surface wetting properties of the top and bottom surfaces of the Janus(o) membrane were evaluated by measuring the in-air contact angle (CA) with several liquids (water, 4 mM SDS solution, mineral oil, and ethanol) and underwater contact angle with mineral oil, using an optical tensiometer (Theta Lite, Biolin Scientific). The underwater adhesion between oil and the membrane surfaces was assessed using oil probe force spectroscopy performed using a tensiometer (T114, Attension, Finland). The detailed procedure of the oil probe force spectroscopy was documented elsewhere (Wang Z et al. *Environ. Sci. Technol.* 2016, 50 (7), 3866-3874; Wang Z et al. *J. Membr. Sci.* 2017, 527, 68-77; Wang Z et al. *J. Membr. Sci.* 2016, 516, 113-122).

Membrane Distillation Antiwetting and Antifouling Tests.

A direct contact membrane distillation configuration was used in all membrane distillation experiments for membrane performance testing, with feed and distillate temperatures maintained to be 60° C. and 20° C., respectively. The cumulative mass and the conductivity of distillate was constantly measured, from which the real-time water flux and salt rejection were calculated.

Figure 4:
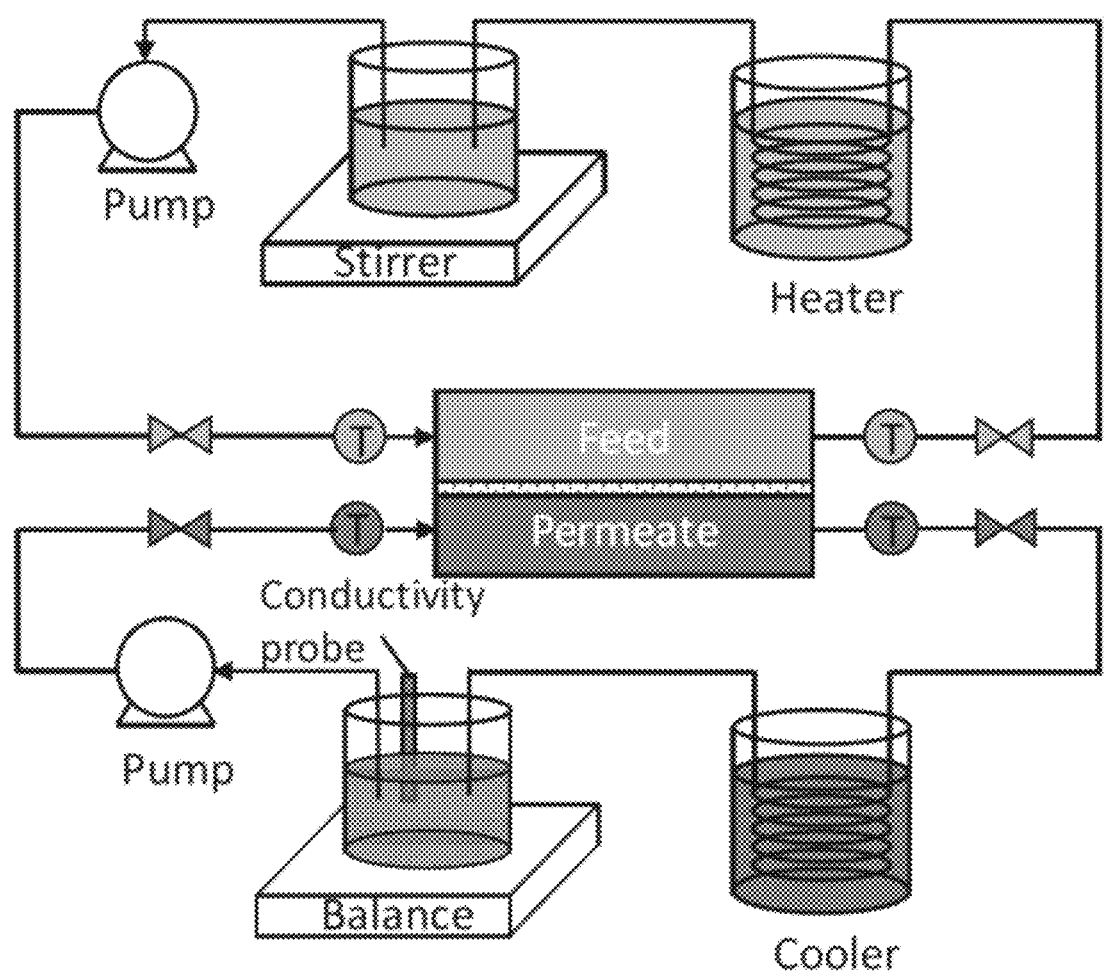
FIG. 4 is a schematic of the membrane distillation cell test system.

The membrane distillation cell was operated in a co-current flow mode (FIG. 4). The effective membrane area was (2.5 cm×8 cm). Plastic mesh spacers were used in both feed side and permeate side. The permeate tank was placed on an on-line scale to record mass change in real-time. A conductivity meter was placed in the permeate tank to record the conductivity change every 2 min. The salinity of the solution was calculated from the measured conductivity based on a pre-established calibration curve.

The Janus(o) membrane was tested in membrane distillation experiments with feed solutions containing either oil foulants or amphiphilic surfactants. Its membrane distillation performance, in terms of normalized flux and salt rejection, was compared to that of the reference membranes including the hydrophobic PVDF-HFP membrane, the omniphobic membrane, and the Janus(h) membrane.

Figure 5:
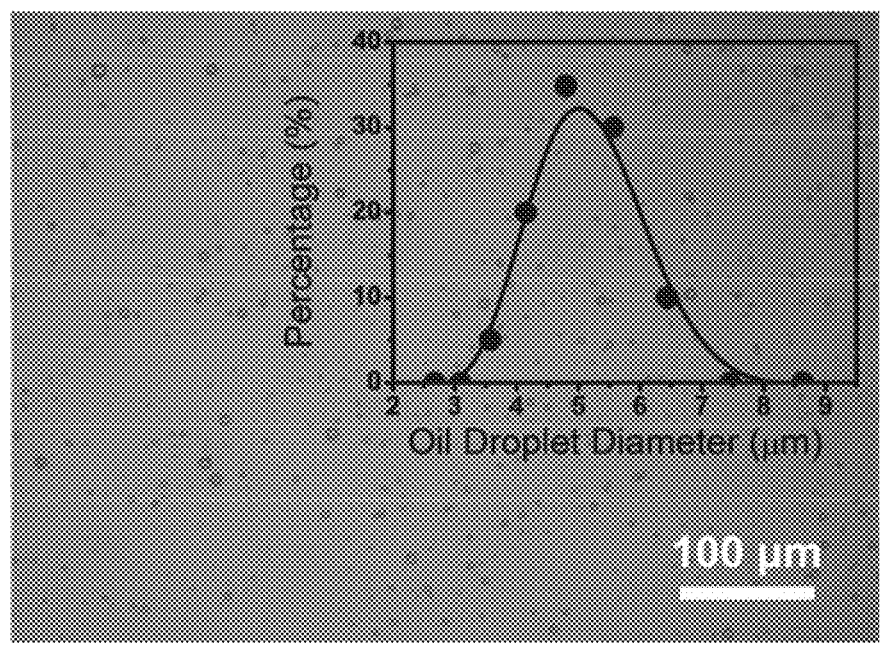
FIG. 5 is a microscopic image of crude oil droplets in the crude oil (in water) emulsion prepared via vigorous physical emulsification. The inset shows the distribution of the oil droplet diameter of the emulsion.

The fouling experiments were conducting using an oily saline feed solution with 1,000 ppm (wt %) crude oil and a salinity of 35 g $L^{-1}$ (NaCl). This oily saline feed solution was prepared by mixing 2 g of crude oil with 2 L of NaCl aqueous solution at 16,000 rpm for 15 minutes using a homogenizer (Fisher Scientific, Waltham, Mass.). The resulting oil-in-water emulsion with micron-sized oil droplets (5.0±0.75 μm) was kinetically stable with no observable phase separation overnight (FIG. 5). The stability of the oil-in-water emulsion can be due to the presence of naturally occurring emulsifiers in crude oil, such as asphaltenes and oil-soluble acids and bases (Sullivan A P and Kilpatrick P K. *Ind. Eng. Chem. Res.* 2002, 41, 3389; Langevin D et al. *Oil Gas Sci. Technol.* 2004, 59, 511).

For membrane distillation wetting experiments, SDS was added as the amphiphilic agent to the feed solution for inducing membrane pore wetting. The addition of SDS was incremental so that the SDS concentrations of the feed solution after three additions were 0.1 mM, 0.2 mM, and 0.4 mM, respectively. The flow rates of feed and distillate streams were controlled to be 0.45 L min$^{-1}$ and 0.2 L min$^{-1}$, respectively, so that the feed hydraulic pressure was slightly higher than that of distillate stream in the membrane distillation setup. This operation condition facilies unambiguous detection of wetting if it occurs, as it certainly leads to increases in both water flux and distillate salinity (Lin S et al. *Environ. Sci. Technol. Lett.* 2014, 1 (11), 443-447, Boo C et al. *Environ. Sci. Technol.* 2016, 50 (15), 8112-8119; Lee J et al. *ACS Appl. Mater. Interfaces* 2016, 8 (17), 11154-11161). Both fouling and wetting experiments were performed in replicates with only one set of representative results presented in the following discussions.

Morphology and Wetting Properties of the Janus(o) Membranes.

Figure 6:
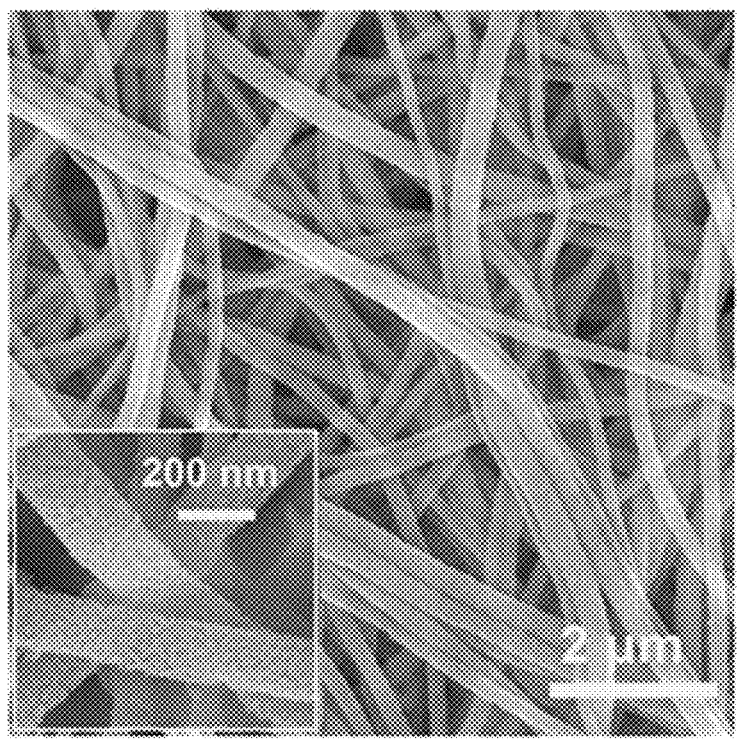
FIG. 6 is a scanning electron microscopy (SEM) image of the Janus membrane substrate. The inset features the SiNPs on individual fibers.
Figure 7:
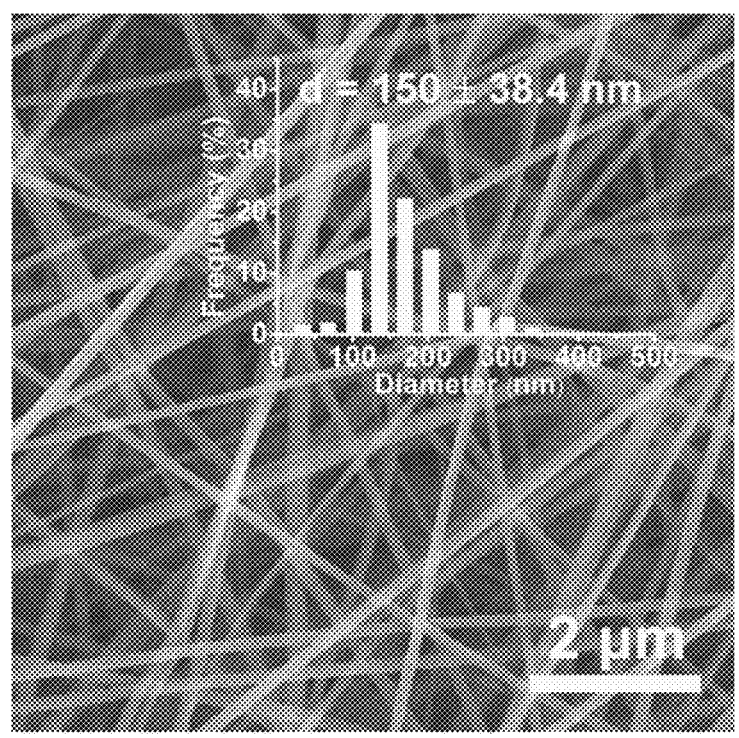
FIG. 7 is a SEM image of PVDF-HFP/CTAB and its fiber diameter distribution.
Figure 8:
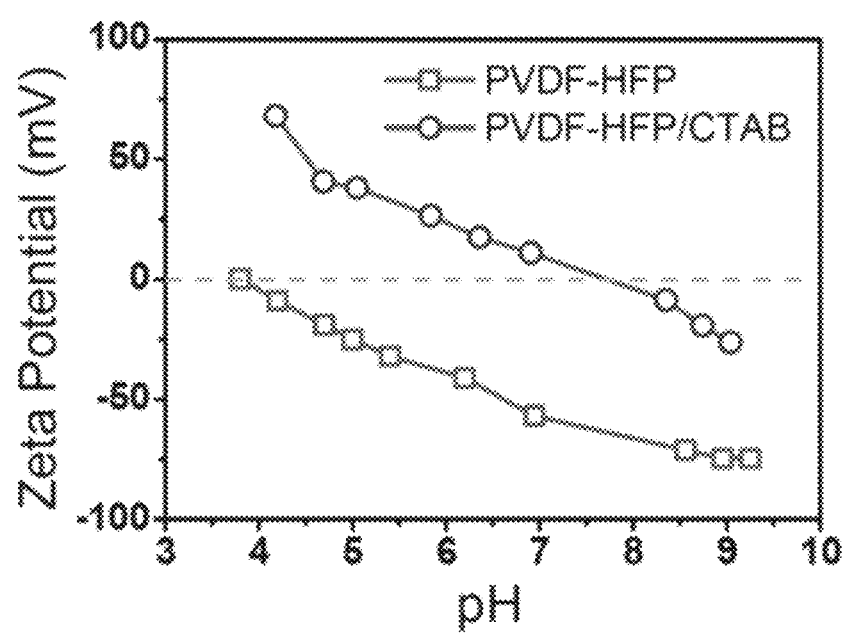
FIG. 8 shows the ζ-Potentials of the PVDF-HFP and PVDF-HFP/CTAB electrospun membranes. The electrolyte solution was 1 mM KCl and the pH was automatically adjusted by the addition of KOH and HCl.
Figure 9:
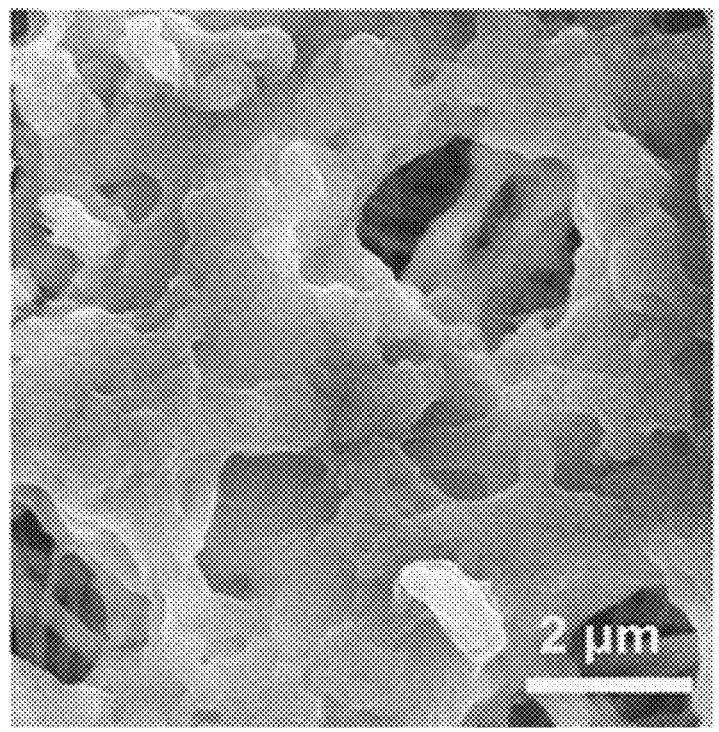
FIG. 9 is an SEM image of the SiNPs-CTS/PFO nanoparticle-polymer composite coating on a Janus membrane surface.

The electrospun CTAB/PVDF-HFP substrate of the Janus (o) membrane has a fibrous structure with a mean fiber diameter of 188±22 nm (FIG. 6). These fibers are significantly smaller in diameter than the PVDF-HFP fibers without CTAB (FIG. 7), possibly due to the higher charge density of the dope solution that led to more significant stretching under the strong electric field. Streaming potential measurements suggest that the CTAB/PVDF-HFP fibrous network is positively charged when pH is below 7, whereas the PVDF-HFP matrix is negatively charged throughout the pH range tested (FIG. 8). The positive charges on the CTAB/PVDF-HFP fibers facilitated the adsorption of SiNPs. Nanoscale SiNPs were clearly observed on individual fibers (FIG. 6, inset) after dip-coating, yielding a second level reentrant structure on top of the first level reentrant structure imparted by the fibrous network itself (Kota A K et al. *NPG Asia Mater.* 2014, 6 (7), e109; Liu T L et al. *Science* 2014, 346 (6213), 1096-1100: Tuteja et al. *Proc. Natl. Acad. Sci. U.S.A* 2008, 105 (47), 18200-18205). The skin layer of the Janus(o) membrane is composed of a SiNPs-CTS/PFO composite that formed a continuous and rough surface with micron-sized pores (FIG. 9).

Figure 10:
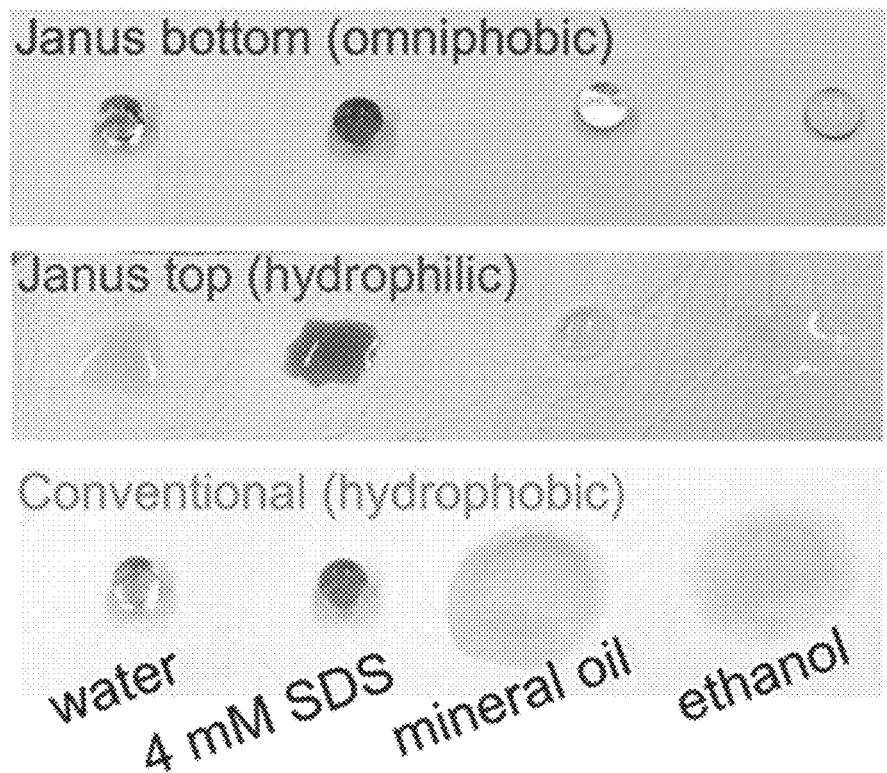
FIG. 10 is photographic images of different liquid droplets on the bottom surface and top surface of the Janus(o) membrane and on the hydrophobic PVDF-HFP membrane.
Figure 11:
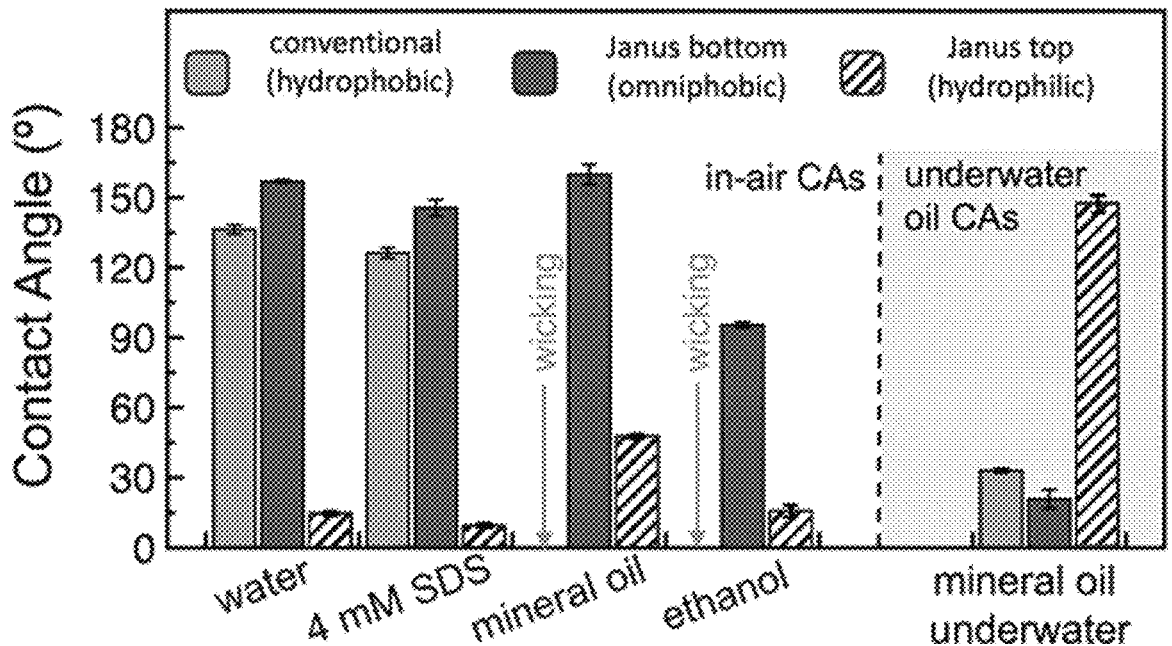
FIG. 11, to the left of the dashed line, shows the in-air sessile drop contact angles (CAs) for three different surfaces (in-air hydrophobic, omniphobic, and hydrophilic) with four liquids (water, 4 mM SDS solution, mineral oil, and ethanol).

The in-air contact of different liquids with the top and bottom surfaces of the Janus(o) membrane, and with surface of a hydrophobic PVDF-HFP membrane, is shown in FIG. 10. The in-air contact angles with different liquids and the underwater contact angles with mineral oil for the same three surfaces are summarized in FIG. 11. The in-air contact angles of the PVDF-HFP membrane were 136.4±2.4° and 127.4±2.7° for water and 4 mM SDS solution, respectively. However, mineral oil (γ≈30 mN m$^{-1}$) and ethanol (γ=22.1 mN m$^{-1}$) completely wicked the PVDF-HFP membrane (Lee J et al. *ACS Appl. Mater. Interfaces* 2016, 8 (17), 11154-11161). In contrast, the omniphobic bottom of the Janus(o) membrane was able to resist wetting by all tested liquids, yielding in-air contact angles of 156.9±0.8°, 145.6±4.5°, 159.9±4.3°, and 95.4±1.40 for water, 4 mM SDS solution, mineral oil, and ethanol, respectively. None of the liquids, regardless of surface tension, was able to wick through the omniphobic substrate due to the presence of dual-scale reentrant architecture. The in-air contact angles of the same tested liquids on the top surface of the Janus membrane were rather low (FIG. 11), suggesting the coated surface was in-air amphiphilic.

Comparing the wetting properties between the hydrophobic PVDF-HFP membrane and the in-air amphiphilic top surface of the Janus(o) membrane (FIG. 10), it was observed that while a conventional hydrophobic membrane was resistant to wetting by high-surface-tension liquids but wicked by low-surface-tension liquids, the top surface of a Janus(o) membrane was wetted by all but not wicked by any of the tested liquids. This special wetting property of the Janus(o) membrane results from the combination of an in-air amphiphilic skin layer that all liquids can wet and an omniphobic substrate that no liquid can penetrate through.

The surface wetting properties directly relevant to membrane fouling were elucidated by underwater-oil contact angles measured with a mineral droplet on membrane samples inversely submerged in water. Both the reference hydrophobic membrane and the omniphobic bottom of the Janus(o) membrane exhibited very low underwater-oil contact angles (FIG. 11), which can be due to the strong attractive hydrophobic interaction between oil and the low-surface-energy materials of the hydrophobic or omniphobic fibrous network (Wang Z et al. *Water Res.* 2017, 112, 38-47: Israelachvili J et al. *Nature* 1982, 300, 341-342; Tsao Y et al. *Science* 1993, 262 (5133), 547-550; Meyer E E et al. *Proc. Natl. Acad. Sci. U.S.A* 2006, 103 (43), 15739-15746). However, an omniphobic porous substrate, even without the hydrophilic SiNPs-CTS/PFO surface coating, differed significantly from the hydrophobic membrane in that the oil droplet was able to wick through the hydrophobic membrane but not the omniphobic porous substrate, which was evidenced by the clearly observable oil stain on the back of the hydrophobic membrane but not on that of a standalone omniphobic membrane. Similar to the mechanism behind its in-air omniphobicity, the ability of a standalone omniphobic fibrous network to resist wicking by a spreading oil puddle underwater is attributable to the Cassie-Baxter state sustained by both low-surface-energy material and hierarchical reentrant texture (Kota A K et al. *NPG Asia Mater.* 2014, 6 (7), e109: Tuteja et al. *Proc. Natl. Acad. Sci. U.S.A* 2008, 105 (47), 18200-18205).

In comparison, the SiNPs-CTS/PFO coated surface of the Janus membrane was underwater super oleophobic (FIG. 11) due to the hydration of the rough nanoparticle-polymer composite coating layer (Chen S et al. *Polymer* 2010, 51 (23), 5283-5293: Tiraferri A et al. *Environ. Sci. Technol.* 2012, 46, 11135-11144; Lu D et al. *Sep. Purif Technol.* 2016, 165, 1-9). For the oil droplet to spread over and physically contact the Janus membrane surface, the hydration layer on the SiNPs-CTS/PFO surface has to be eliminated, which is thermodynamically highly unfavorable (Rinaudo M. *Prog. Polym. Sci.* 2006, 31 (7), 603-632: Howarter J et al. *J. Colloid Interface Sci.* 2009, 329 (1), 127-132; Anjali Devi D et al. *J. Membr. Sci.* 2005, 262 (1-2), 91-99: Dudchenko A V et al. *ACS Nano* 2015, 9 (10), 9930-9941). Moreover, the presence of SiNPs enhances the surface roughness and thus the hydration area, which further augments the hydration force and renders the surface underwater super oleophobic (Wang Z et al. *J. Membr. Sci.* 2017, 527, 68-77).

Figure 12:
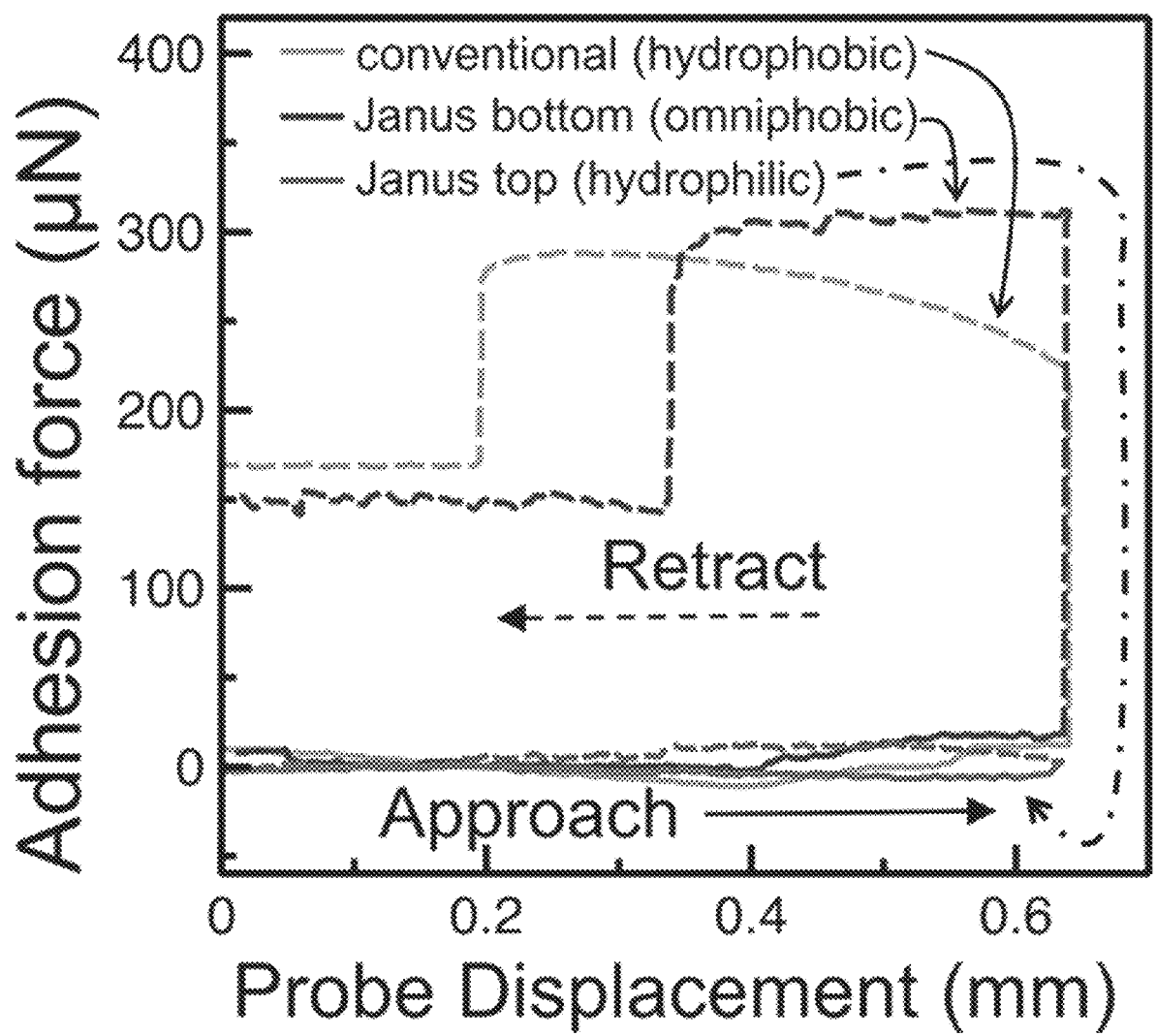
FIG. 12 is the force curves from tensiometer-based oil probe force spectroscopy for the hydrophobic, omniphobic (Janus bottom), and hydrophilic (Janus top) surfaces.

Oil probe force spectroscopy was also conducted to assess the interaction between an oil droplet and surfaces with different wetting properties, which is relevant to understanding the impact of surface wettability on membrane fouling propensity. The force curves in FIG. 12 indicate attraction of oil droplets to both a reference hydrophobic PVDF-HFP membrane and an omniphobic membrane (same as the substrate of a Janus(o) membrane) and retention of oil droplets by these two membranes. This implies that membrane fouling would likely occur with both hydrophobic and standalone omniphobic membrane distillation membranes if the membrane distillation feed solution contains hydrophobic contaminants. In comparison, no attractive oil-membrane interaction or oil retention by the surface was observed with the SiNPs-CTS/PFO coated top surface of the Janus membrane. The qualitative comparison between interactions with different surfaces, which was consistent between multiple sets of force curve measurements, correlate well with the measured underwater-oil contact angles.

Wetting Resistance of the Janus(o) Membrane.

The Janus(o) membrane was tested in membrane distillation experiments using feed solution with progressively increasing SDS concentration to evaluate its wetting resistance. For comparison, the same experiments were conducted using a hydrophobic PVDF-HFP membrane, a Janus (h) membrane, and an omniphobic membrane.

The membranes were first tested in a direct contact membrane distillation system with a 0.6 M NaCl solution as the feed solution to measure their initial water vapor flux and to confirm no wetting occurred in the absence of any wetting agent. In subsequent wetting experiments, the time-dependent fluxes of the membranes were recorded and normalized by the respective initial fluxes of the two membranes. The SDS concentration was gradually increased to induce wetting and the electrical conductivity of the distillate was constantly monitored. For non-wetted membranes, the salt rejection should be near perfect and the distillate conductivity should remain very low. In the presence of pore wetting, convective flow through the wetted pores occurs, which impacts the measured flux and distillate salinity dependent on the direction of the convective flow. To ensure unequivocal detection of pore wetting, the feed stream pressure was controlled to be slightly higher than that of the distillate stream, so that any pore wetting would consistently increase the water flux and distillate salinity (Wang Z et al. *Environ. Sci. Technol.* 2016, 50, 3866: Lin S et al. *Environ. Sci. Technol. Lett.* 2014, 1, 443; Wang Z and Lin S. *Water Res.* 2017, 112, 38).

Figure 13:
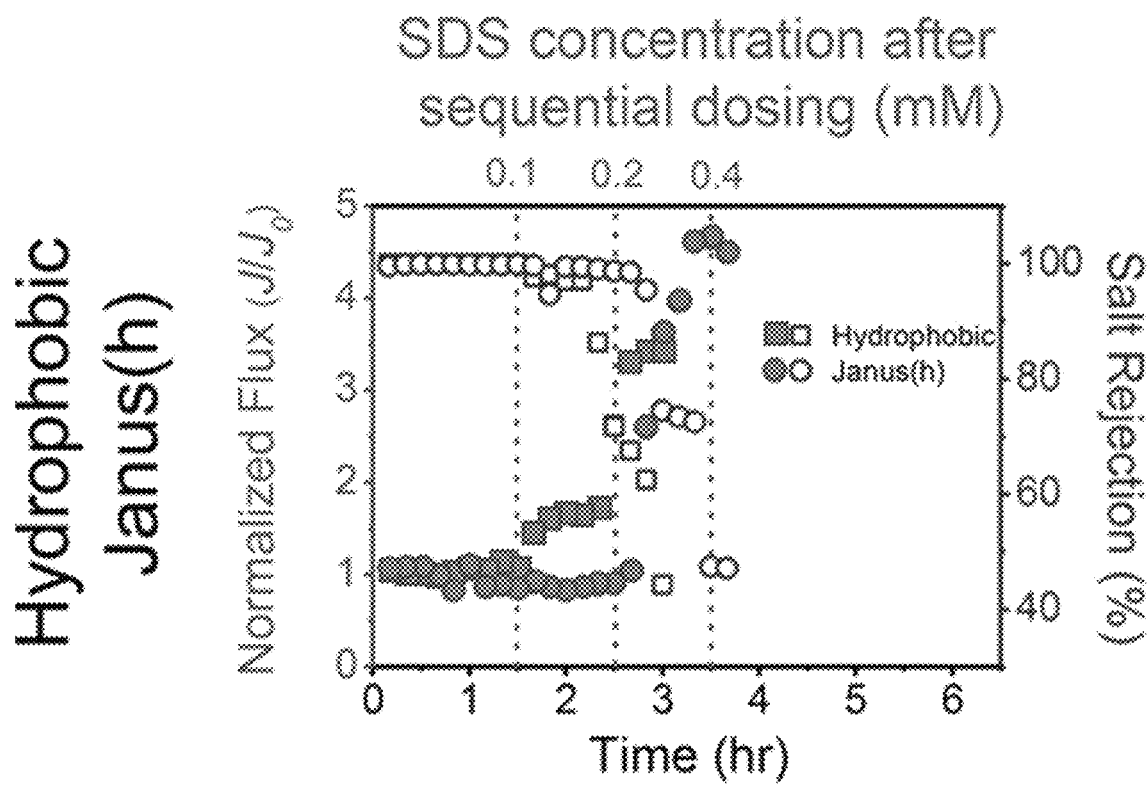
FIG. 13 shows the normalized water flux, $J/J_0$, (left axis, solid data points) and salt rejection (right axis, open data points) for membrane distillation wetting experiments with the hydrophobic membrane (square data points) and Janus (h) membrane (circle data points). For all membrane distillation experiments, the feed and distillate temperatures were 60 and 20° C., respectively.
Figure 14:
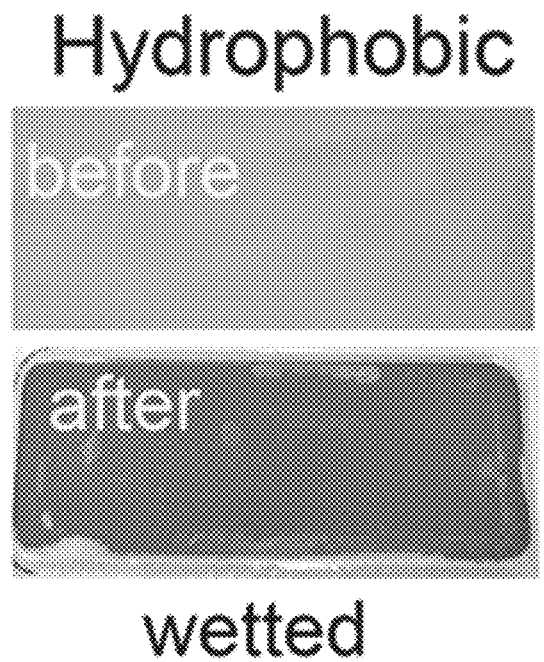
FIG. 14 is photographic images of the hydrophobic membrane before and after the wetting experiments shown in FIG. 13.

FIG. 13 shows the time-dependent normalized fluxes and salt rejections for both the hydrophobic and Janus(h) membranes. Both the hydrophobic and Janus(h) membranes were wetted in the presence of SDS, with the hydrophobic and Janus(h) membranes failing at SDS concentrations of 0.1 mM and 0.2 mM, respectively. Consequently, the water fluxes increased by multiple times, and the salt rejection significantly dropped (a salt rejection below 99% is typically considered unacceptable in membrane distillation). The wetting of the hydrophobic PVDF-HFP membrane can also be clearly observed by visually inspecting the membrane after the membrane distillation experiments: the feed solution wicked through the membrane pores completely, rendering the wetted membrane translucent (FIG. 14). As a result, the distillate became unacceptably saline due to the direct permeation of the saline feed solution through the wetted pores.

Figure 15:
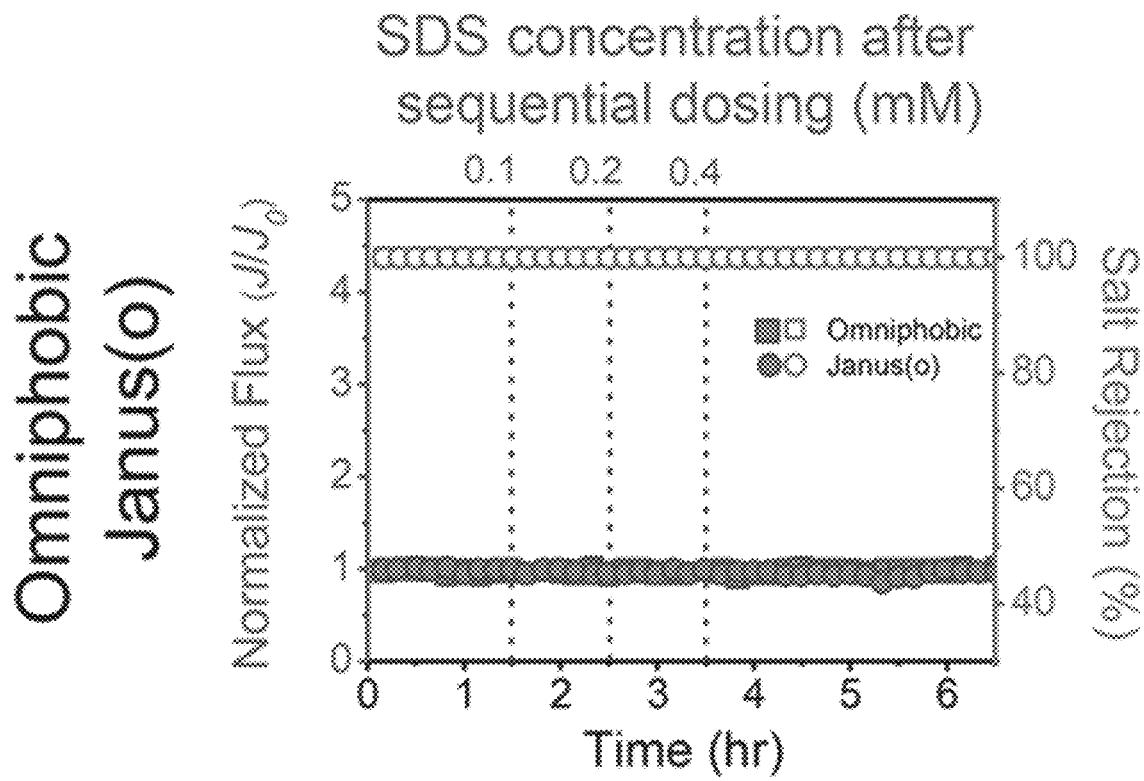
FIG. 15 shows normalized water flux. $J/J_0$, (left axis, solid data points) and salt rejection (right axis, open data points) for membrane distillation wetting experiments using the omniphobic membrane (square data points) and the Janus(o) membrane (circle data points). For all membrane distillation experiments, the feed and distillate temperatures were 60 and 20° C., respectively.
Figure 16:
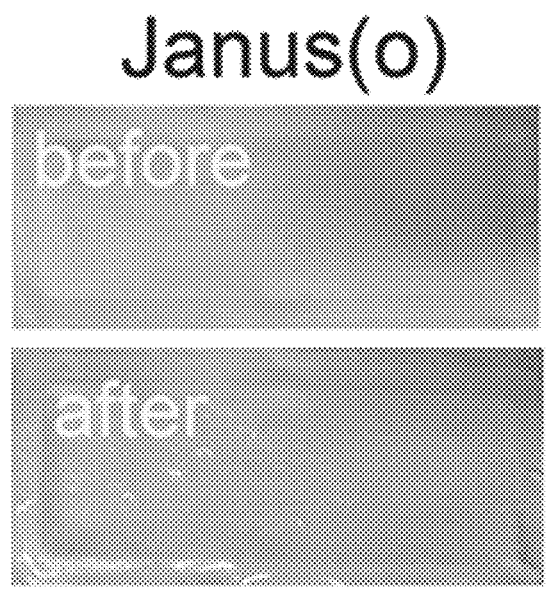
FIG. 16 is photographic images of the Janus(o) membrane before and after the wetting experiments shown in FIG. 15.

In comparison, the Janus(o) membrane and the omniphobic membrane were able to sustain a stable membrane distillation performance even in the presence of 0.4 mM SDS, evidenced by the stable water vapor flux and perfect salt rejection (FIG. 15). Visual inspection of the Janus(o) membrane before and after the experiment suggests that, although the top surface of the Janus(o) membrane was wetted due to its hydrophilicity, the feed solution was not able to wick through the underlying omniphobic substrate (FIG. 16). The prevention of the penetration of feed solution with surfactants through the membrane pores was rendered possible by the hierarchical reentrant structure of the omniphobic fibrous network (Lin S et al. *Environ. Sci. Technol. Lett.* 2014, 1 (11), 443-447; Boo C et al. *Environ. Sci. Technol.* 2016, 50 (15), 8112-8119: Lee J et al. *ACS Appl. Mater. Interfaces* 2016, 8 (17), 11154-11161; Huang Y X et al. *J. Membr. Sci.* 2017, 531, 122-128). As a result, the distillate obtained using the Janus(o) membrane had a satisfyingly low salinity.

Fouling Resistance of the Janus(o) Membrane.

Figure 17:
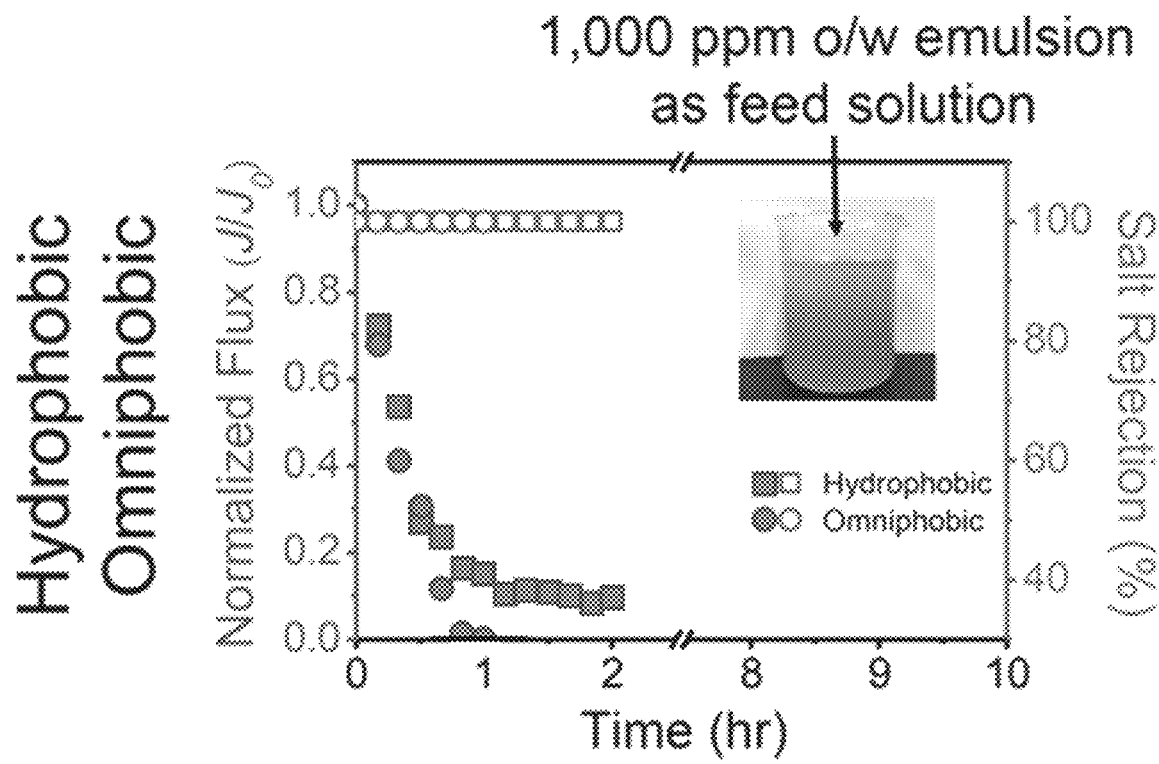
FIG. 17 shows the normalized water fluxes. $J/J_0$, (left axis, solid data points) and salt rejections (right axis, open data points) for membrane distillation fouling experiments with the hydrophobic membrane (square data points) and omniphobic membrane (circle data points). For all membrane distillation experiments, the feed and distillate temperatures were 60° C. and 20° C., respectively. The feed solution was a saline oil-in-water emulsion with 35 g/L NaCl and 1000 ppm crude oil.
Figure 18:
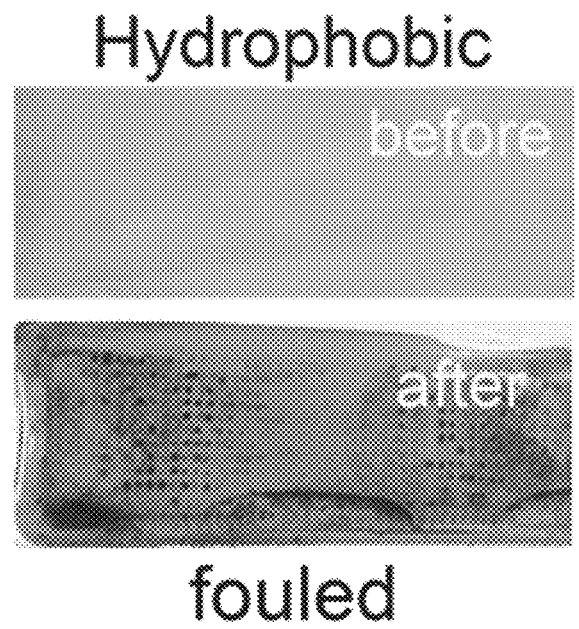
FIG. 18 is photographic images of the hydrophobic membrane before and after the fouling experiments shown in FIG. 17.
Figure 19:
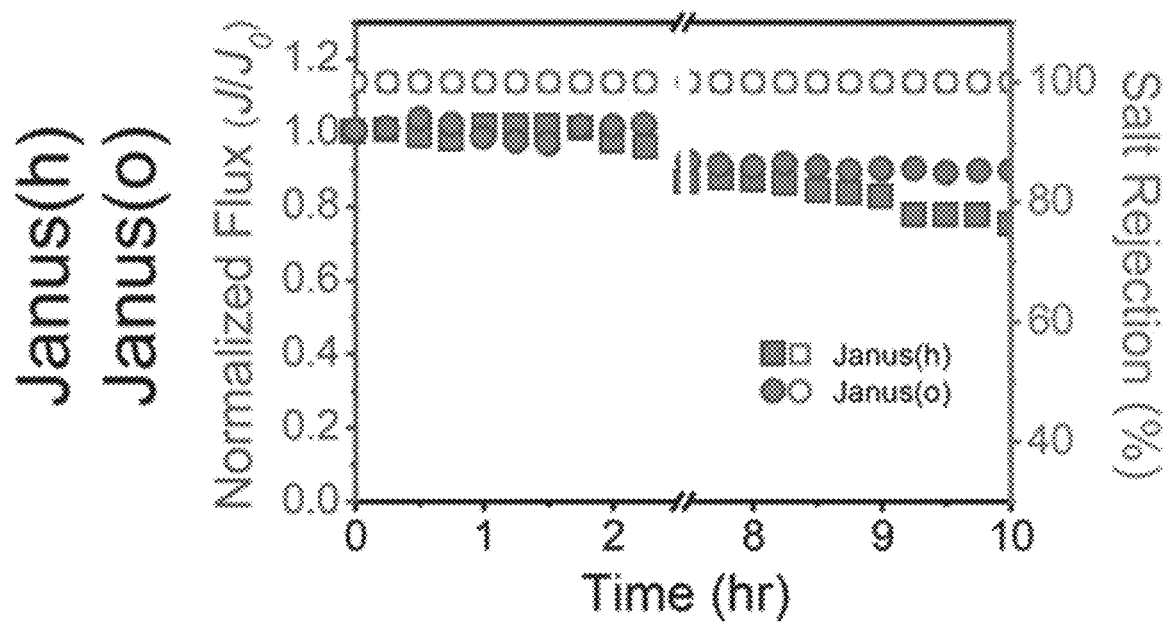
FIG. 19 shows the normalized water fluxes, $J/J_0$, (left axis, solid data points) and salt rejections (right axis, open data points) for membrane distillation fouling experiments with the Janus(o) membrane (circle data points) and Janus(h) membrane (square data points). For all membrane distillation experiments, the feed and distillate temperatures were 60° C. and 20° C., respectively. The feed solution was a saline oil-in-water emulsion with 35 g/L NaCl and 1000 ppm crude oil.
Figure 20:
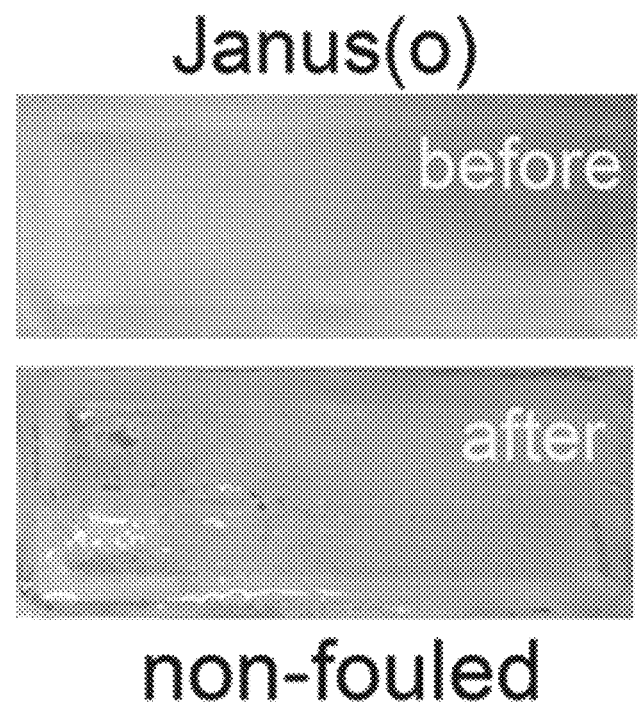
FIG. 20 is photographic images of the Janus(o) membrane before and after the fouling experiments shown in FIG. 19.

In membrane distillation experiments with oil-in-water emulsion as the feed solution, the hydrophobic PVDF-HFP membrane and the omniphobic membrane were fouled rapidly, with their water vapor fluxes dropping to less than 20% of the initial flux within 1 h of operation, even though the salt rejection was unaffected (FIG. 17). Visual inspection of the PVDF-HFP membrane before and after the experiments also reveals that the membrane was severely fouled with oil stains on the surface (FIG. 18). Rinsing the membrane surface with DI water was not able to remove those stains, suggesting the irreversibility of fouling. The Janus membranes, including both Janus(o) and Janus(h) membranes, on the other hand, were able to sustain stable membrane distillation performance with both their fluxes and salt rejections remaining near constant over 10 h of operation (FIG. 19). The adhesion of oil foulants onto the Janus(o) membrane surface was minimal according to visual inspection of the Janus membrane after the fouling experiments (FIG. 20). The membrane distillation performances of the hydrophobic and Janus membranes in the presence of oil foulants are well corroborated by the measured underwater-oil contact angles and the results from the oil-probe force spectroscopy. The presence of the SiNPs-CTS/PFO coating rendered the surface Janus membranes underwater super oleophobic and resistant to the adhesion of micron-sized crude oil droplets. Because the crude oil droplets were significantly larger than the characteristic pore size of the SiNPs-CTS/PFO coating layer, the transport of oil droplets across this coating layer to reach the underlying hydrophobic or omniphobic substrates was both energetically and sterically impeded. Consequently, the hydrophobic oil droplets did not affect the underlying omniphobic substrate of the Janus membrane.

Figure 21:
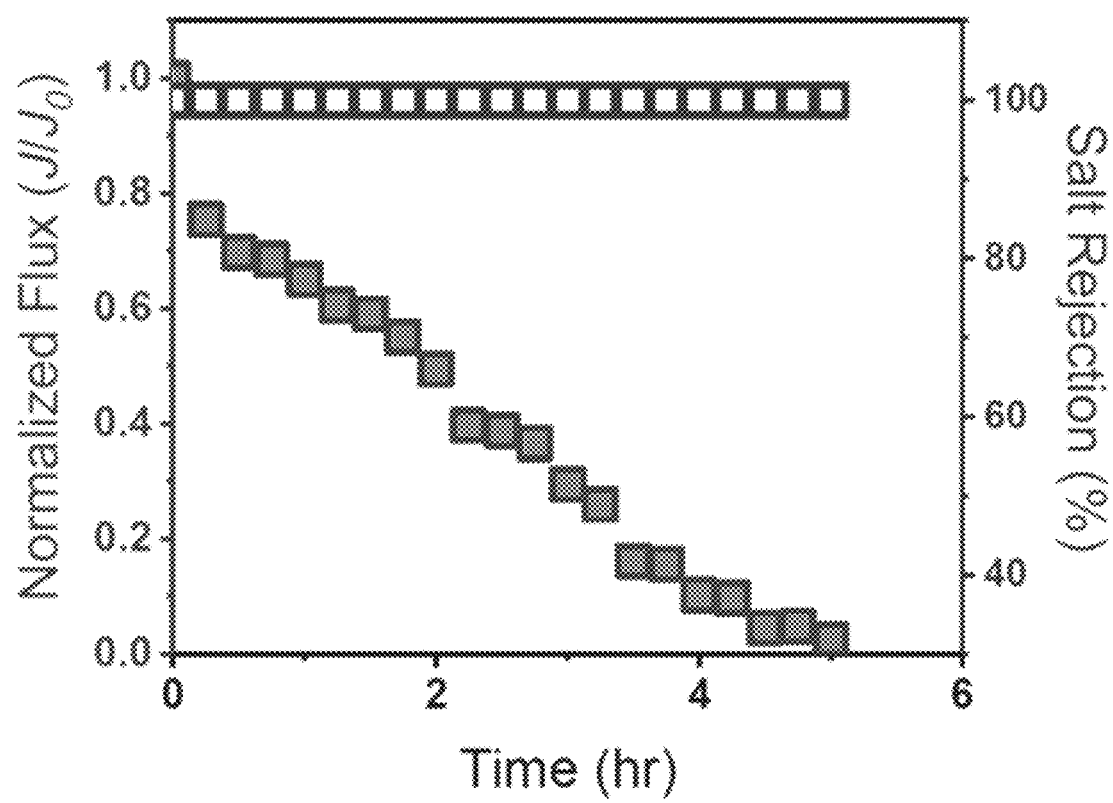
FIG. 21 shows the normalized water fluxes, $J/J_0$, (left axis, solid data points) and salt rejections (right axis, open data points) for a membrane distillation fouling experiment with the hydrophobic membrane (square data points) with the feed and distillate temperatures being 60 and 30° C., respectively.

The initial water fluxes for the hydrophobic, omniphobic, Janus(h), and Janus(o) membranes in the membrane distillation fouling experiments were 34.1, 13.3, 24.7, and 14.1 L m$^{-2}$ h$^{-1}$, respectively (FIG. 17 and FIG. 20). Additional membrane distillation experiments were conducted for the hydrophobic membrane with the feed and distillate temperatures being 60° C. and 30° C., respectively. With this higher distillate temperature, the flux was reduced to 13.9 L m$^{-2}$ h$^{-1}$ (FIG. 21), which was comparable to the fluxes of the omniphobic and Janus(o) membrane. This additional experiment was performed to demonstrate that fouling of the hydrophobic PVDF membrane was not due to its higher initial flux which, beyond a critical level, may strongly promote oil fouling (Zhu X et al. *J. Membr. Sci.* 2017, 529, 159-169).

These results from the wetting and fouling membrane distillation experiments using membranes with different wetting properties led to a holistic picture regarding how surface wettability impacts the ability of a membrane for membrane distillation to resist fouling and wetting (FIG. 2). The mitigation of wetting induced by amphiphiles requires robust omniphobicity, preferably imparted by a hierarchical reentrant structure, to maintain the Cassie-Baxter state when the surface tension of the feed solution is reduced. The prevention of oil fouling, on the other hand, demands an in-air hydrophilic and underwater super oleophobic surface that can resist oil adhesion. Therefore, only the Janus (o) membrane integrating an omniphobic substrate and an in-air hydrophilic surface is simultaneously anti-wetting and antifouling and can thus deliver outstanding membrane distillation performance with feed solutions of different compositions.

The recent developments in engineering materials with particular wetting properties have significantly advanced membrane-based separations, not only by enhancing the performance of existing technologies but also by enabling new technologies or existing technologies for new applications that were not feasible with conventional materials. Herein, an example of how engineering the surface wettability can enable an existing desalination process, membrane distillation, to treat challenging feedwater that it previously failed to treat.

The Janus membrane described herein integrating an antiwetting omniphobic substrate and an antifouling in-air hydrophilic, underwater super-oleophobic skin layer enabled membrane distillation (MD) to desalinate hypersaline brine with both hydrophobic foulants and amphiphilic wetting agents. Engineered to overcome the limitations of existing membrane distillation membranes, the Janus membrane exhibited wetting properties unobserved in any existing membrane, including hydrophobic membranes, omniphobic membranes, and hydrophobic membranes with a hydrophilic surface coating. Being simultaneously resistant to both membrane fouling and wetting, the Janus membrane can sustain stable membrane distillation performance even with challenging feed waters and can thus potentially transform membrane distillation to be a viable technology for desalinating hypersaline wastewater with complex compositions using low-grade-thermal energy.

Other advantages which are obvious and which are inherent to the disclosure will be evident to one skilled in the art. It will be understood that certain features and sub-combinations are of utility and may be employed without reference to other features and sub-combinations. This is contemplated by and is within the scope of the claims. Since many possible embodiments may be made without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

What is claimed is:

1. A composite membrane having a top portion and a bottom portion, the top portion being hydrophilic in air and oleophobic under water and the bottom portion being omniphobic, the composite membrane comprising:
    an omniphobic substrate having a hierarchical reentrant structure;
        wherein the omniphobic subtrate comprises a plurality of electrospun polymer fibers and a plurality of pores, the plurality of electrospun polymer fibers being coated with a plurality of particles, the plurality of pores and the plurality of particles forming the hierarchical reentrant structure;
        wherein the plurality of electrospun polymer fiber comprise a hydrophobic polymer and a surface charge dopant, the hydrophobic polymer comprising poly(vinylidene fluoride-co-heafluoropropylene) (PVDF-HFP) and the surface charge dopant comprising cetyltrimethylammonium bromide (CTAB);
        wherein the plurality of particles comprise a plurality of fluorinated silicon dioxide particles;
        wherein the omniphobic substrate has a surface, the surface being coated with a dual functional layer that is hydrophilic in air and oleophobic under water, the coated surface of the omniphobic substrate being the top portion of the composite membrane;
        wherein the dual functional layer comprises a surface roughness component, a hydrophilic component, and a low surface energy material;
        wherein the surface roughness component comprises a plurality of silicon dioxide particles;
        wherein the hydrophilic component comnprises chitosan; and wherein the low surface energy material comprises a fluorinated compound, the fluorinated compoound comprising perfluorooctanoate.

2. The composite membrane of claim 1, wherein the plurality of fluorinated silicon dioxide particles coating the plurality of electrospun polymer fibers have an average particle size of from 10 nm to 1000 nm.

3. The composite membrane of claim 2, wherein the plurality of fluorinated silicon dioxide particles comprise a plurality of silicon dioxide particles and a fluoroalkylsilane.

4. The composite membrane of claim 2, wherein the plurality of fluorinated silicon dioxide particles are attached to the plurality of electrospun polymer fibers by electrostatic attraction.

5. The composite membrane of claim 1, wherein the plurality of silicon dioxide particles comprising the surface roughness component have an average particle size of from 10 nm to 1000 nm.

6. A method of making the composite membrane of claim 1, the method comprising depositing the dual functional layer on the surface of the omniphobic substrate.

7. The method of claim 6, further comprising forming the omniphobic substrate by electrospinning.

8. A method of use of the composite membrane of claim 1 for membrane distillation of a contaminated brine solution, wherein the contaminated brine solution comprises a hydrophobic contaminant, an amphiphilic contaminant, or a combination thereof.

9. The method of claim 8, wherein the composite membrane is antiwetting and antifouling.

10. The method of claim 8, wherein the composite membrane exhibits a salt rejection of 99% or more over the course of the distillation.

* * * * *

UNITED STATES PATENT AND TRADEMARK OFFICE
CERTIFICATE OF CORRECTION

PATENT NO. : 10,722,847 B2
APPLICATION NO. : 15/995677
DATED : July 28, 2020
INVENTOR(S) : Shihong Lin et al.

It is certified that error appears in the above-identified patent and that said Letters Patent is hereby corrected as shown below:

In the Claims

Claim 1 - Lines 13-19 (Column 24, Lines 49-54) should read: "wherein the plurality of electrospun polymer fibers comprise a hydrophobic polymer and a surface charge dopant, the hydrophobic polymer comprising poly(vinylidene fluoride-co-hexafluoropropylene) (PVDF-HFP) and the surface charge dopant comprising cetyltrimethylammonium bromide (CTAB)";

Claim 1 - Lines 33-35 (Column 25, Lines 1-3) should read: "wherein the low surface energy material comprises a fluorinated compound, the fluorinated compound comprising perfluorooctanoate".

Signed and Sealed this
Sixth Day of October, 2020

Andrei Iancu
*Director of the United States Patent and Trademark Office*